United States Patent
Kojima et al.

(10) Patent No.: US 9,026,322 B2
(45) Date of Patent: May 5, 2015

(54) SPEED CHANGE CONTROLLING APPARATUS FOR MOTORCYCLE

(75) Inventors: Hiroyuki Kojima, Wako (JP); Masaki Nakagawara, Wako (JP); Takashi Ozeki, Wako (JP); Yoshiaki Tsukada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 495 days.

(21) Appl. No.: 13/410,387

(22) Filed: Mar. 2, 2012

(65) Prior Publication Data

US 2012/0239264 A1   Sep. 20, 2012

(30) Foreign Application Priority Data

Mar. 18, 2011   (JP) ................. 2011-060715

(51) Int. Cl.
| | |
|---|---|
| *B60W 10/02* | (2006.01) |
| *B60W 10/10* | (2012.01) |
| *F16H 61/00* | (2006.01) |
| *B60W 30/02* | (2012.01) |
| *F16H 61/16* | (2006.01) |
| *F16H 61/04* | (2006.01) |
| *B60W 30/18* | (2012.01) |
| *B60W 10/113* | (2012.01) |

(52) U.S. Cl.
CPC .......... *B60W 30/02* (2013.01); *B60Y 2300/022* (2013.01); *F16H 61/16* (2013.01); *B60Y 2200/12* (2013.01); *F16H 61/0437* (2013.01); *B60W 10/113* (2013.01); *B60W 30/18145* (2013.01); *B60W 2520/14* (2013.01); *B60W 2520/18* (2013.01)

(58) Field of Classification Search
USPC ..................................... 701/51, 53
See application file for complete search history.

(56) References Cited

U.S. PATENT DOCUMENTS 7,490,687 B2   2/2009   Suzuki
2004/0172184 A1*   9/2004   Vukovich et al. .............. 701/51

FOREIGN PATENT DOCUMENTS

| DE | 10350046 | 5/2005 |
|---|---|---|
| DE | 102008027621 | 12/2008 |
| DE | 102009004426 | 10/2009 |
| JP | 2007-218269 | 8/2007 |

* cited by examiner

*Primary Examiner* — John Q Nguyen
*Assistant Examiner* — Kyung Kim
(74) *Attorney, Agent, or Firm* — Rankin, Hill & Clark LLP

(57) ABSTRACT

A speed change controlling apparatus in which the mode of driving force transmission is depends upon the roll angle of a vehicle body. When a roll angle is within a range from a second roll angle, which corresponds to a full bank state, to a first roll angle, speed change operation is carried out by soft speed change control in which variation of the driving force with respect to time is smaller than that by normal speed change control. If the roll angle is within another range from the first roll angle to a third roll angle, then normal speed change is carried out and if the roll angle is within a further range from an uprightly standing state to the third roll angle, then speed change operation is executed by direct speed change. When the roll angle is greater than the second roll angle, speed change is inhibited.

15 Claims, 14 Drawing Sheets

SPEED CHANGE CONTROLLING APPARATUS FOR MOTORCYCLE

BACKGROUND OF THE INVENTION

1. Field of the Invention

The present invention relates to a speed change controlling apparatus for a motorcycle, and particularly to a speed change controlling apparatus for a motorcycle capable of executing speed change control in response to a roll angle of a vehicle body.

2. Description of Related Art

Conventionally, an automatic transmission is known which changes over meshing engagement of speed change gears by an actuator such as a motor so that the speed can be changed automatically (full-automatic) or semi-automatically (semi-automatic). Such an automatic transmission as just described automatically changes the speed based on information of an engine speed, a shift stage of the transmission, a throttle opening and so forth upon full-automatic speed change but carries out speed change operation in response to an operation of a speed changing switch mounted on a steering handle bar or the like upon semi-automatic speed change.

In Japanese Patent Laid-Open No. 2007-218269, a speed change controlling apparatus is disclosed which detects a roll angle (bank angle) of a vehicle body of a motorcycle and inhibits speed change operation of an automatic transmission if the detected roll angle is greater than a predetermined angle. With this technique, the influence of a driving force variation involved in speed change operation on the vehicle body posture or the like during cornering in which the roll angle is great can be prevented.

SUMMARY OF THE INVENTION

However, even if the motorcycle is cornering, if the roll angle of the vehicle body is small, then speed change operation that does not have an influence on the vehicle body posture and so forth can be carried out. Further, there is the possibility that, if the driving force variation upon speed change can be controlled in response to the roll angle, then the range of the roll angle within which the speed can be changed can be enlarged. Particularly, when a DCT (dual clutch transmissions), which includes two clutches, is used, since the speed can be changed without cutting off the driving force from the engine to the driving wheel, the roll angle at which the speed can be changed can be enlarged. Where control only of inhibiting speed change operation is carried out with reference to a single predetermined angle as in such a technique as disclosed in Japanese Patent Laid-Open No. 2007-218269, there is a subject that a speed changing request in such a roll angle region as described above cannot be satisfied.

The present invention is directed toward solving the problems in the art described above and toward providing a speed change controlling apparatus for a motorcycle that can execute speed change control in which the mode of driving force transmission is different depending upon the roll angle of a vehicle body.

In accordance with one aspect of the present invention, a speed change controlling apparatus for a motorcycle that includes an engine adapted to generate driving force for the motorcycle, the speed change controlling apparatus disposed between the engine and a driving wheel and adapted to carry out speed change for the driving force of the engine to transmit the resulting driving force to the driving wheel, a roll angle detection device for detecting a roll angle of the motorcycle, and a control section adapted to control the speed change controlling apparatus in response to a predetermined speed changing request but control the speed change controlling apparatus not to carry out normal speed change control when the roll angle exceeds a first roll angle, has a first characteristic in that the control section carries out speed change operation by soft speed change control in which variation of the driving force with respect to time is smaller than that by the normal speed change control within a region of the roll angle from the first roll angle to a second roll angle which is greater than the first roll angle.

According to this aspect of the invention, since the control section carries out the speed change operation by the soft speed change control in which variation of the driving force with respect to time is smaller than that by the normal speed change control within a region of the roll angle from the first roll angle to the second roll angle which is greater than the first roll angle, the driving force can be prevented from varying in a state in which the vehicle body banks by a great amount. Further, in a roll angle region in which the operation burden on the driver is not so heavy that speed change operation is inhibited, speed change control in which variation of the driving force with respect to time is small is carried out. Therefore, even if the motorcycle banks upon cornering or the like, a large range of the roll angle within which speed change can be carried out automatically can be assured, and consequently, control specifications which can satisfy a speed change request to the utmost to such a range as described above.

In accordance with another aspect of the invention, the control section carries out the speed change operation by direct speed change control in which variation of the driving force with respect to time is greater than that by the normal speed change control within a region from an uprightly standing state in which the roll angle is zero to a third roll angle smaller than the first roll angle, but carries out the speed change operation by the normal speed change control within a region between the third roll angle and the first roll angle.

According to this aspect, the control section carries out the speed change operation by the direct speed change control in which the variation of the driving force with respect to time is greater than that by the normal speed change control within a region from an uprightly standing state in which the roll angle is zero to the third roll angle smaller than the first roll angle, but carries out the speed change operation by the normal speed change control within a region between the third roll angle and the first roll angle. Therefore, the normal speed change operation is carried out within a region within which the roll angle is comparatively small and, even if the speed change operation is carried out, the influence on the vehicle body posture or the like is small. However, the speed change control in which reduction of speed change time is prioritized is carried out within a region within which the roll angle is small and the vehicle body is placed in a state similar to an uprightly standing state. By this, quick speed change operation which can satisfy a demand of the driver can be implemented.

In accordance with a further aspect of the invention, the control section changes a switching speed of a clutch of a twin clutch type speed change gear, which includes a one-side clutch and the other side clutch, to make the magnitudes of the driving force variation in the soft speed change control, normal speed change control and direct speed change control different from one another.

According to this aspect of the invention, since the control section changes the switching speed of a clutch of the twin clutch type speed change gear which includes a one-side clutch and the other side clutch to make the magnitudes of the driving force variation in the soft speed change control, normal speed change control and direct speed change control different from one another, setting of the magnitude of the driving force variation in each speed change control can be executed easily and accurately.

In further accordance with the present invention, as the roll angle increases, the timing at which the clutch capacity is to be increased is delayed in order to change over the one side clutch or the other side clutch which has been in a disconnection state before the speed change into a connection state. As the roll angle increases, the timing at which the clutch capacity is to be increased is delayed in order to change over the one side clutch or the other side clutch which has been in a disconnection state before the speed change into a connection state. Therefore, adjustment of the clutch switching speed can be executed readily by control of the clutch capacity.

Further, the roll angle is decided with reference to a gravity direction using the roll angle detection device which is configured from a gyro sensor. Since the roll angle is decided with reference to the gravity direction using the roll angle detection device configured from a gyro sensor, an accurate roll angle can be obtained without being influenced by an inclination angle of the road surface or the like.

In accordance with another aspect of the invention, when the roll angle exceeds the second roll angle, the speed change operation is inhibited. Therefore, the driving force variation involved in the speed change operation can be prevented from being generated during cornering in which the bank angle is great.

In accordance with another aspect of the present invention, the roll angle detection device is configured from a gyro sensor capable of detecting not only the roll angle but also a pitch angle of a vehicle body, and the control section inhibits the speed change operation when the pitch angle of the vehicle body exceeds a second pitch angle, but carries out the speed change operation by the soft speed change control in which variation of the driving force with respect to time is smaller than that by the normal speed change control within a region of the pitch angle from a first pitch angle, which is smaller than the second pitch angle, to the second pitch angle.

Based upon this aspect, the roll angle detection device is configured from a gyro sensor capable of detecting not only the roll angle but also a pitch angle of the vehicle body, and the control section inhibits the speed change operation when the pitch angle of the vehicle body exceeds the second pitch angle, but carries out the speed change operation by the soft speed change control in which the variation of the driving force with respect to time is smaller than that by the normal speed change control within the region of the pitch angle from the first pitch angle which is smaller than the second angle to the second pitch angle. Therefore, also when pitching operation occurs with the vehicle body, a speed change request of the driver can be satisfied while reducing the operation burden on the driver as far as possible. Consequently, a riding feeling which satisfies the demand of the user can be obtained.

In accordance with another feature of the invention, the roll angle detection device is configured from a gyro sensor capable of detecting not only the roll angle but also a yaw angle of a vehicle body, and the control section detects the yaw angle when the soft speed change control is executed in response to the roll angle and decides whether the vehicle body is advancing into a corner or escaping from a corner based on a relationship between the yaw angle and the roll angle, and executes, when the vehicle body is advancing into a corner, the soft speed change control in which shift up is inhibited but shift down is permitted, but executes, when the vehicle body is escaping from a corner, the soft speed change control in which shift down is inhibited but shift up is permitted.

As roll angle detection device is configured from a gyro sensor capable of detecting not only the roll angle but also a yaw angle of the vehicle body, and the control section detects the yaw angle when the soft speed change control is executed in response to the roll angle. Then, the control section decides whether the vehicle body is placed in a corner advancing state or a corner escaping state based on a relationship between the yaw angle and the roll angle. Then, if the vehicle body is in a corner advancing state, then the control section executes the soft speed change control in which shift up is inhibited but shift down is permitted. However, if the vehicle body is in a corner escaping state, then the control section executes the soft speed change control in which the shift down is inhibited but shift up is permitted. Therefore, shift up which is unnecessary in a corner advancing state or shift down which is unnecessary in a corner escaping state is inhibited thereby to prevent appearance of a driving force variation by a wrong speed change operation.

BRIEF DESCRIPTION OF THE DRAWINGS

These and other aspects of the invention will be apparent with reference to the following description and drawings, wherein.

DETAILED DESCRIPTION OF THE PREFERRED EMBODIMENTS

Figure 1:
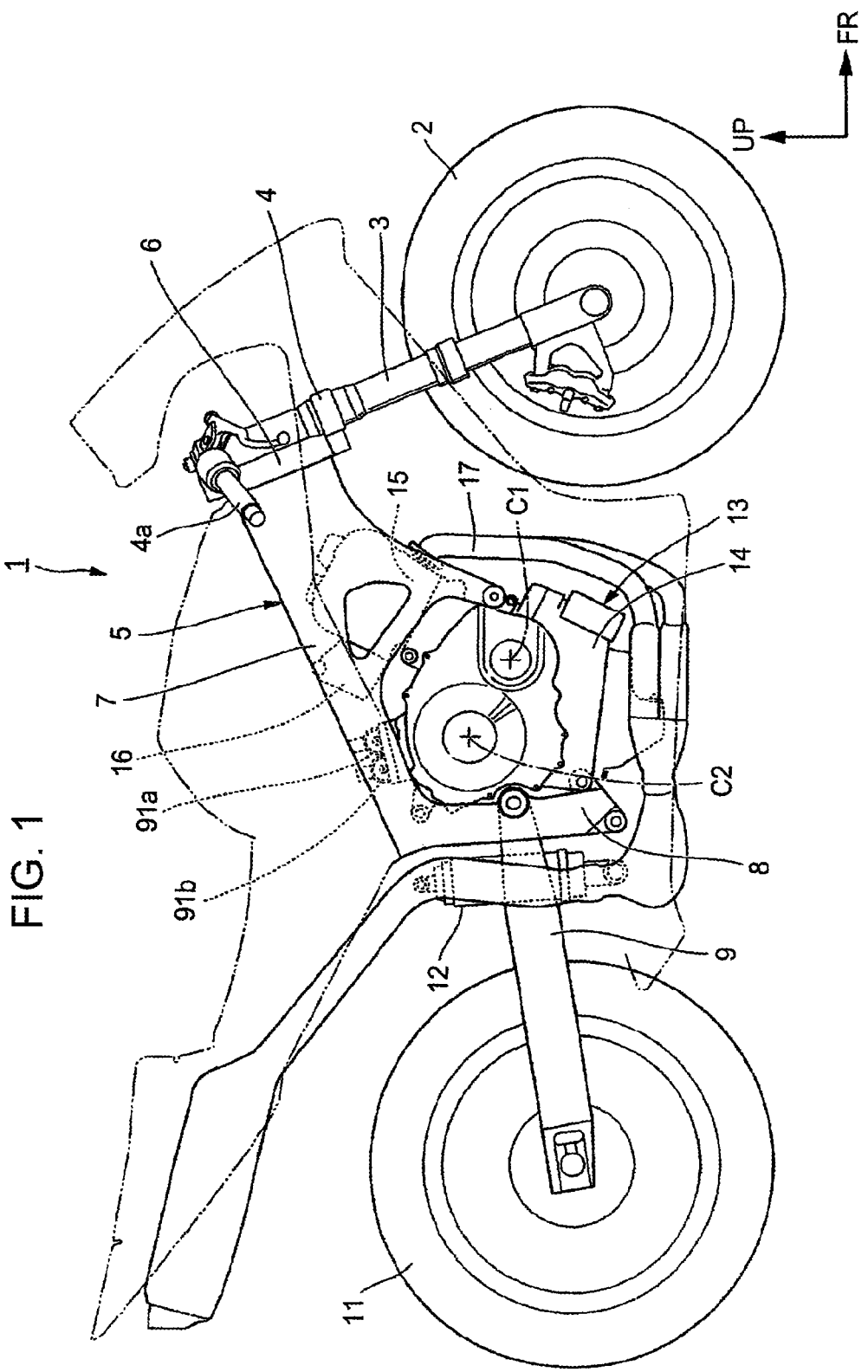
FIG. 1 is a side elevational view of a motorcycle according to an embodiment of the present invention.

In the following, a preferred embodiment of the present invention is described in detail with reference to the drawings.

Unless otherwise specified, directions such as forward, backward, leftward and rightward directions in the description given below are same as those of a vehicle. Further, an arrow mark FR in the drawings indicates the forward direction of the vehicle, an arrow mark LH indicates the leftward direction of the vehicle, and an arrow mark UP indicates the upward direction of the vehicle.

FIG. 1 is a side elevational view of a motorcycle 1 as a saddle type vehicle to which a speed change controlling apparatus according to the present embodiment is applied. A front fork 3 which supports a front wheel 2 for rotation thereon is pivotally supported at an upper portion thereof on a head pipe 6 at a front end portion of a vehicle body frame 5 through a steering stem 4 for steering manipulation. A steering handle bar 4a is mounted at an upper portion of the steering stem 4. A main frame 7 extends rearwardly from a rear portion of the head pipe 6 and connects to a pivot plate 8. On the pivot plate 8, a swing arm 9 is pivotally supported at a front end portion thereof for upward and downward rocking motion, and a rear wheel 11 is supported for rotation at a rear end portion of the swing arm 9. A cushion unit 12 is interposed between the swing arm 9 and the vehicle body frame 5. On the inner side of the vehicle body frame 5, an engine 13 which is a power source of the motorcycle 1 is mounted.

Figure 2:
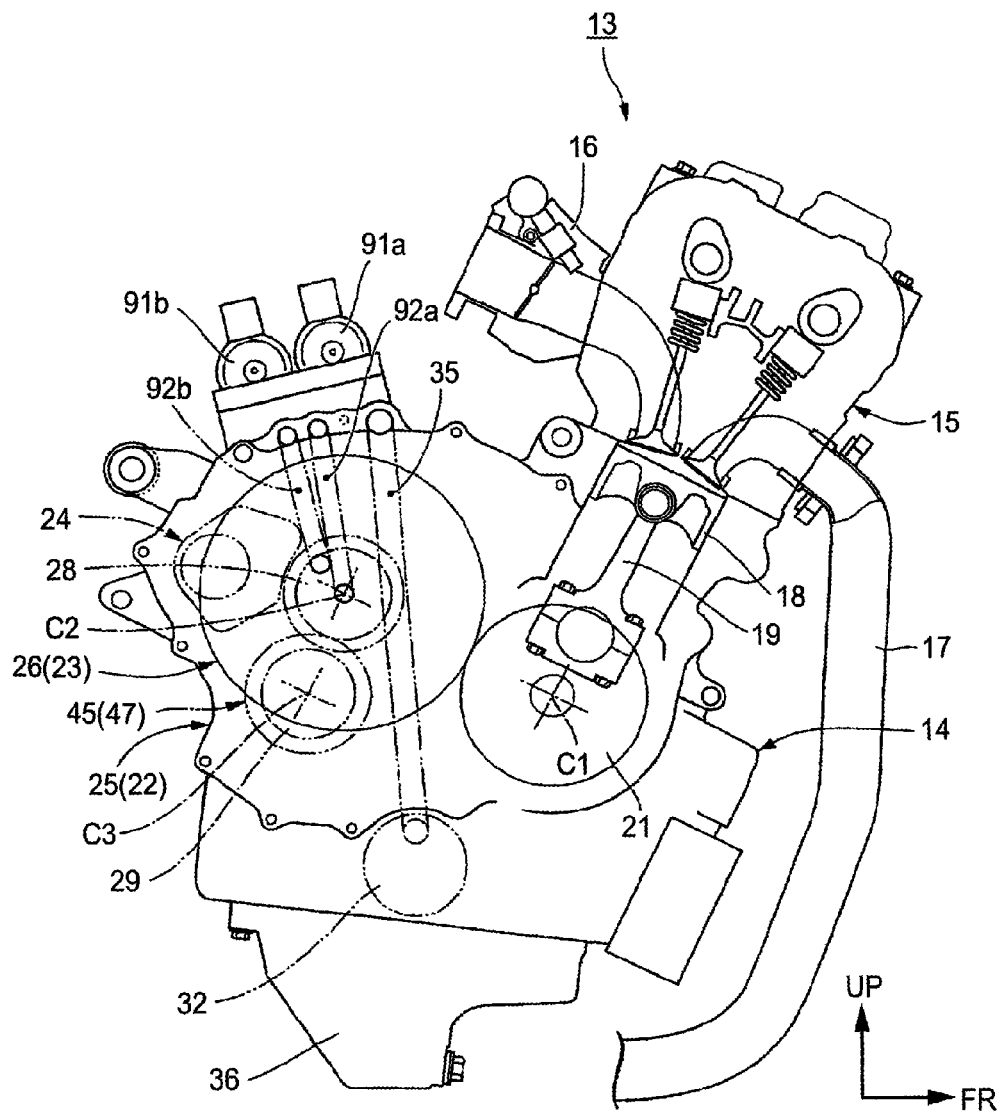
FIG. 2 is a right side elevational view of an engine of the motorcycle.

Referring also to FIG. 2, the engine 13 is a parallel four-cylinder engine in which an axial line C1 of the center of rotation of a crankshaft 21 is directed along a vehicle widthwise direction, and a cylinder block 15 is provided uprightly at an upper portion of a crankcase 14. A piston 18 corresponding to each of the cylinders is fitted for back and forth movement in the cylinder block 15, and back and forth movement of the piston 18 is converted into rotational movement of the crankshaft 21 through a connecting rod 19. A throttle body 16 is connected to a rear portion of the cylinder block 15, and an exhaust pipe 17 is connected to a front portion of the cylinder block 15.

A mission case 22 is integrally connected to the rear of the crankcase 14, and a twin clutch type speed change gear 23 and a changing mechanism 24 are accommodated in the mission case 22. A clutch case 25 is placed on the right side in the vehicle widthwise direction of the mission case 22, and a twin clutch 26 of the twin clutch type speed change gear 23 is accommodated in the inside of the clutch case 25. The rotational power of the crankshaft 21 is outputted to the left side of the mission case 22 in the vehicle widthwise direction through the twin clutch type speed change gear 23 and then is transmitted to the rear wheel 11 through a power transmission mechanism, for example, of the chain type. A countershaft 29 directed in a direction of an axial line C3 of the center of rotation is disposed below a main shaft 28 disposed so as to be directed in a direction of an axial line C2 of the center of rotation.

Figure 3:
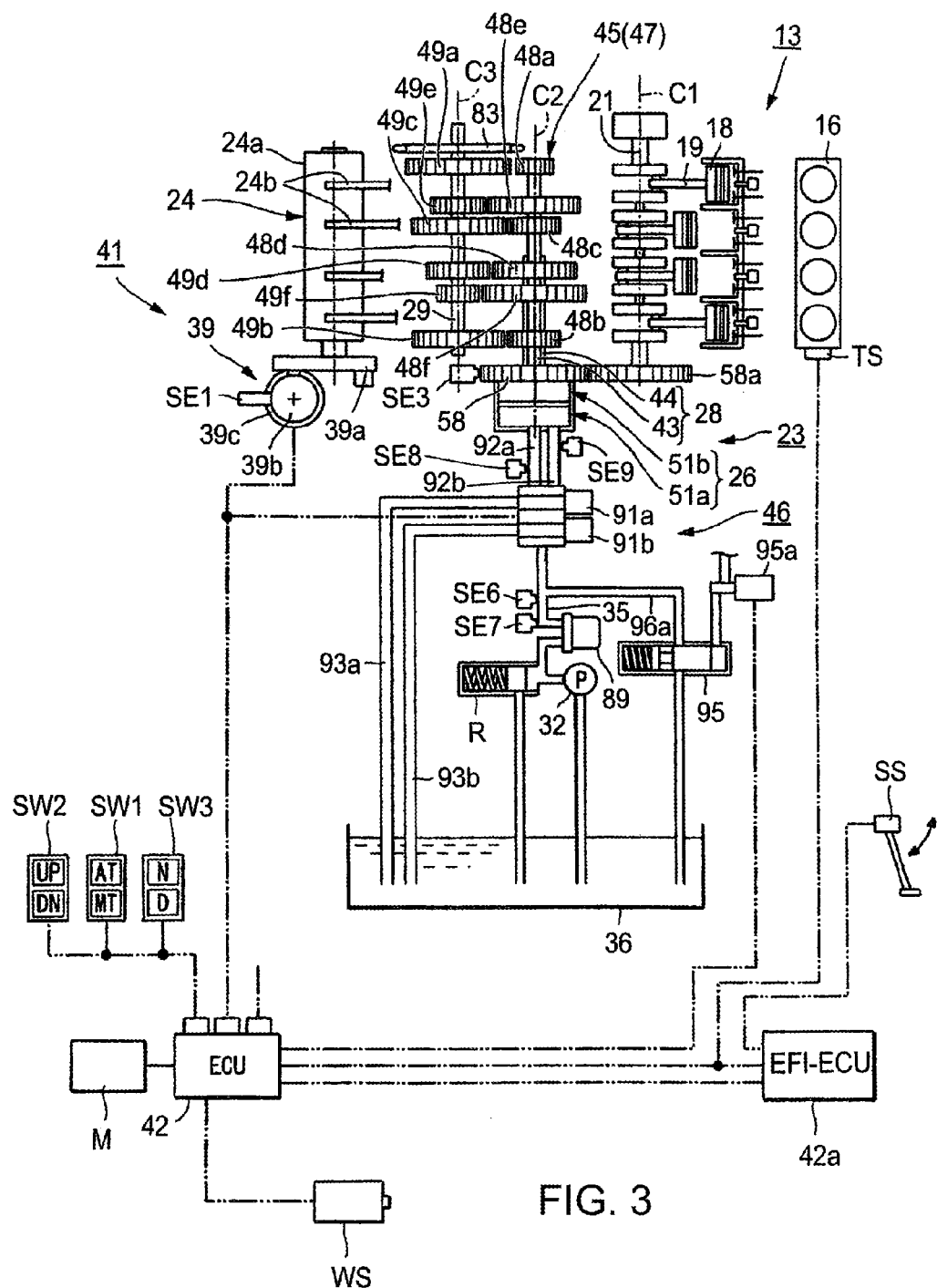
FIG. 3 is a schematic view of a configuration of a twin clutch type speed change controlling apparatus.
Figure 4:
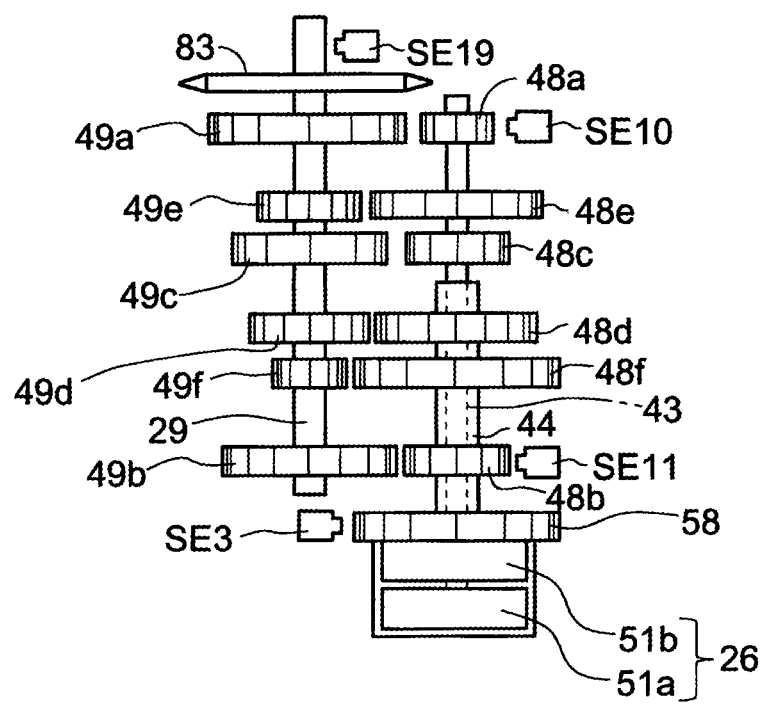
FIG. 4 is a schematic view of a configuration showing a meshing relationship between shafts and speed change gears in an automatic transmission.
Figure 5:
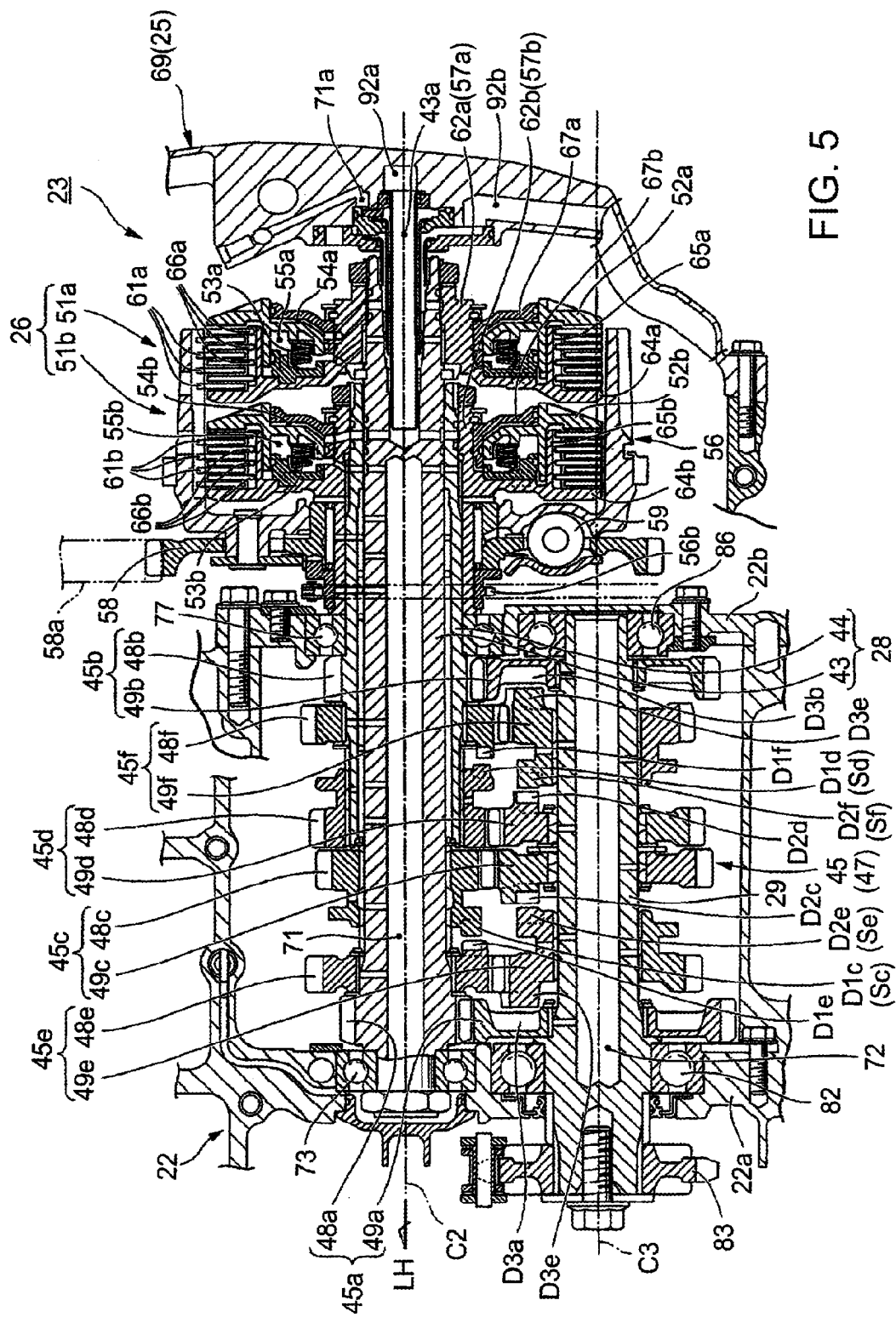
FIG. 5 is a sectional view of a twin clutch type speed change gear.
Figure 6:
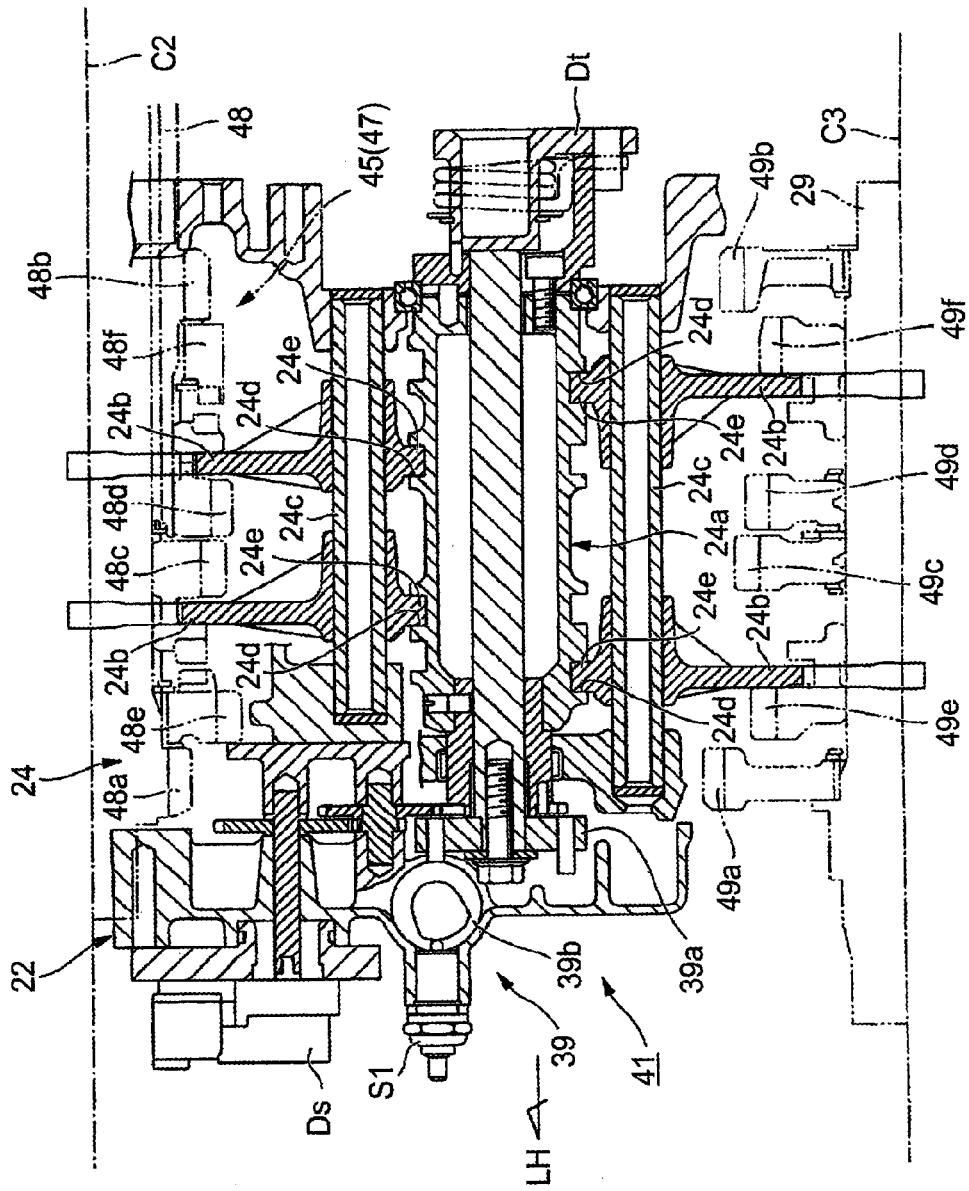
FIG. 6 is a sectional view of a gear shift apparatus.

FIG. 3 is a schematic view of a configuration of a twin clutch type speed change controlling apparatus. Further, FIG. 4 is a schematic view of a configuration showing a meshing relationship between the shafts and the speed change gears in the automatic transmission and FIG. 5 is a sectional view of the twin clutch type speed change gear. Further, FIG. 6 is a sectional view of a gear shift apparatus of the twin clutch type speed change gear.

The twin clutch type speed change controlling apparatus is configured principally from the twin clutch type speed change gear 23 connected to the engine 13, a gear shift apparatus 41 in which a driving mechanism 39 is provided in the changing mechanism 24, and an electronic control unit (ECU) 42 for controlling operation of the twin clutch type speed change gear 23 and the gear shift apparatus 41.

The twin clutch type speed change gear 23 includes the main shaft 28 of a dual structure configured from an inner shaft 43 and an outer shaft 44, the countershaft 29 disposed in parallel to the main shaft 28, a speed change gear group 45 disposed across the main shaft 28 and the countershaft 29, the twin clutch 26 disposed coaxially at a right end portion of the main shaft 28 in the vehicle widthwise direction, and a pressure oil supplying apparatus 46 for supplying working pressure oil to the twin clutch 26. An aggregate configured from the main shaft 28, countershaft 29 and speed change gear group 45 is hereinafter referred to as a transmission 47.

The inner shaft 43 of the main shaft 28, which extends leftwardly and rightwardly of the main case 22 in the vehicle widthwise direction, is fitted at a right side portion thereof for relative rotation in the outer shaft 44. Driving gears 48a, 48b, 48c, 48d, 48e and 48f (hereinafter referred to as 48a to 48f) for six speeds in the speed change gear group 45 are distributed and disposed on the outer periphery of the inner and outer shafts 43 and 44. On the other hand, driven gears 49a, 49b, 49c, 49d, 49e and 49f (hereinafter referred to as 49a to 49f) for the six speeds in the speed change gear group 45 are disposed on the outer periphery of the countershaft 29.

Those of the driving gears 48a to 48f and the driven gears 49a to 49f whose shift stages correspond to each other mesh with each other and configure speed change gear pairs 45a, 45b, 45c, 45d, 45e and 45f (hereinafter referred to as 45a to 45f) which individually correspond to the shift stages (refer to FIG. 5). The speed change gear pairs 45a to 45f are set so that the speed reduction ratio decreases in order from the first speed to the sixth speed.

Referring to FIG. 5, a left end portion of the inner shaft 43 in the vehicle widthwise direction extends to a left side wall 22a of the mission case 22 and is supported for rotation on the left side wall 22a through a ball bearing 73. On the other hand, a right side portion of the inner shaft 43 extends through a right side wall 22b of the mission case 22 and is exposed to the inside of the clutch case 25, and the inner shaft 43 is supported at a leftwardly and rightwardly intermediate portion thereof for rotation on the right side wall 22b of the mission case 22 through a leftwardly and rightwardly intermediate portion of the outer shaft 44 that extends through the right side wall 22b similarly to the inner shaft 43 and a ball bearing 77.

The outer shaft 44 is shorter than the inner shaft 43 and is positioned at a left end portion thereof at a leftwardly and rightwardly intermediate portion of the mission case 22. The driving gears 48d, 48f and 48b corresponding to even-numbered shift stages (second, fourth and sixth speeds) are supported in order of those for the fourth speed, sixth speed and second speed from the left side at a portion of the outer shaft 44 positioned leftwardly with respect to the right side wall 22. On the other hand, the driving gears 48a, 48e and 48c corresponding to odd-numbered shift stages (first, third and fifth speeds) are supported in order of those for the first speed, fifth speed and third speed from the left side at a portion of the inner shaft 43 positioned leftwardly with respect to the left end portion of the outer shaft 44.

The countershaft 29 is supported at the left and right end portions thereof for rotation through ball bearings 82 and 86 on the left and right side walls 22a and 22b of the mission case 22, respectively. The left end portion of the countershaft 29 projects leftwardly with respect to the left side wall 22a, and a driving sprocket wheel 83 as a power transmission mechanism for the rear wheel 11 is mounted at the left end portion.

The driven gears 49a to 49f corresponding to the individual shift stages are supported in an order similar to that of the driving gears 48a to 48f at a portion of the countershaft 29 positioned on the inner side with respect to the mission case 22.

In the inside of the main shaft 28 (inner shaft 43) and the countershaft 29, main supply oil paths 71 and 72 capable of supplying pressure oil from a main oil pump (not shown) for pressure feeding oil to the various portions in the engine 13 are formed, respectively, and engine oil is suitably supplied to the speed change gear group 45 through the main supply oil paths 71 and 72.

The twin clutch 26 includes first and second clutches 51a and 51b of the hydraulic type disposed coaxially adjacent each other, and the inner and outer shafts 43 and 44 are connected coaxially to the clutches 51a and 51b, respectively. A primary driven gear 58 for meshing with a primary driving gear 58a of the crankshaft 21 is provided coaxially on a clutch outer 56 shared by the clutches 51a and 51b, and rotational power from the crankshaft 21 is inputted to the clutch outer 56 through the gears 58 and 58a. The rotational power inputted to the clutch outer 56 is transmitted to the inner and outer shafts 43 and 44, respectively, in response to a connection or disconnection state of the clutches 51a and 51b. The connection or disconnection state of the clutches 51a and 51b is individually controlled in accordance with the presence or absence of pressure oil supply from the pressure oil supplying apparatus 46.

Then, one of the clutches 51a and 51b is placed into a connection state while the other is placed into a disconnection state to carry out power transmission in the transmission 47 using one of the speed change gear pairs connected to one of the inner and outer shafts 43 and 44. Further, one of the speed change gear pairs connected to the other of the inner and outer shafts 43 and 44, which is to be used subsequently, is selected in advance. In this state, the one of the clutches 51a and 51b is placed into a disconnection state while the other is placed into a connection state so that the power transmission of the transmission 47 is changed over to the power transmission which uses the speed change gear pair selected in advance thereby to carry out shift up or shift down of the transmission 47.

As shown in FIG. 3, the pressure oil supplying apparatus 46 includes a clutch oil pump 32 that is a generating source of oil pressure for the twin clutch 26, a feeding oil path 35 extending from a discharge port of the clutch oil pump 32, first and second clutch actuators 91a and 91b connected to the downstream side of the feeding oil path 35, and first and second supply oil paths 92a and 92b extending from the clutch actuators 91a and 91b to connection side pressure oil chambers 54a and 54b (refer to FIG. 5) of the clutches 51a and 51b, respectively.

The clutch oil pump 32 is provided separately from the main oil pump, and sucks engine oil in an oil pan 36 below the crankcase 14 and discharges the engine oil into the feeding oil path 35. In the feeding oil path 35, an oil filter 89 for exclusive use for the oil path is provided. For the feeding oil path 35, an oil pressure sensor SE6 and an oil temperature sensor SE7 for detecting the oil pressure and the oil temperature, respectively, and a relief valve R for controlling the rise of the oil pressure in the feeding oil path 35 are provided. Further, for the first and second supply oil paths 92a and 92b, a first clutch oil pressure sensor SE8 and a second clutch oil pressure sensor SE9 for detecting the supply oil pressure to the clutches 51a and 51b are provided, respectively.

The feeding oil path 35 and the first and second supply oil paths 92a and 92b are individually communicatable with each other by operation of the clutch actuators 91a and 91b each formed from a solenoid valve. If the feeding oil path 35 and the first supply oil path 92a are communicated with each other through the first clutch actuator 91a, then comparatively high pressure oil from the clutch oil pump 32 is supplied into the connection side pressure oil chamber 54a to place the first clutch 51a into a connection state. On the other hand, if the feeding oil path 35 and the second supply oil path 92b are communicated with each other through the second clutch actuator 91b, then pressure oil from the clutch oil pump 32 is supplied into the connection side pressure oil chamber 54b of the second clutch 51b to place the second clutch 51b into a connection state.

An oil pressure relief oil path 96a having an oil pressure relief valve 95 branches from the feeding oil path 35. The oil pressure relief valve 95 is operated by a valve actuator 95a to change over the oil pressure relief oil path 96a between open and closed states. The valve actuator 95a whose operation is controlled by the ECU 42 opens, for example, upon starting of the engine, the oil pressure relief oil path 96a to return feed pressure oil from the clutch oil pump 32 to the oil pan 36, and closes, after starting of the engine, the oil pressure relief oil path 96a so that feed pressure oil can be supplied to the twin clutch 26.

Further, in the clutch actuators 91a and 91b, return oil paths 93a and 93b for returning, when the communication between the feeding oil path 35 and the first and second supply oil paths 92a and 92b is blocked, pressure oil from the clutch oil pump 32 into the oil pan are provided, respectively.

The changing mechanism 24 moves a plurality of (four in the present embodiment) shift forks 24b in an axial direction by rotation of a shift drum 24a disposed in parallel to the shafts 28 and 29 to change over the speed change gear pair (shift stage) to be used for power transmission between the main shaft 28 and the countershaft 29.

The shift forks 24b are paired such that one of the shift forks 24b in each pair extends toward the main shaft 28 side while the other shift fork 24b in the pair extends toward the countershaft 29 side, and are supported at the base end side thereof for movement in an axial direction on a pair of shift fork rods 24c. On the base end side of each shift fork 24b, a sliding projection 24e that engages with one of a plurality of camshafts 24d on an outer circumference of the shift drum 24a is provided. Each shift fork 24b is engaged, on the main shaft 28 side and the countershaft 29 side, at an end portion thereof by a slide gear (hereinafter described) of the speed change gear group 45. Then, if the shift drum 24a rotates, the shift forks 24b move in an axial direction along the patterns of the camshafts 24d to move the slide gear in the axial direction to change the shift stage of the transmission 47.

The driving mechanism 39 provided on one end side of the shift drum 24a includes a pin gear 39a fixed coaxially to the shift drum 24a of the changing mechanism 24, a worm-like barrel cam 39b for engaging with the pin gear 39a, and an electric motor 39c for applying rotational power to the barrel cam 39b. The driving mechanism 39 suitably rotates, by driving of the electric motor 39c thereof, the shift drum 24a to change the shift stage of the transmission 47. A gear position sensor SE1 for detecting the operation amount of the driving mechanism 39 in order to detect the shift stage of the transmission 47 is provided for the driving mechanism 39. Further, a rotational angle sensor Ds for detecting the rotational angle of the shift drum 24a is provided for a transmission gear which meshes with a left end portion of the shift drum 24a, and a detent mechanism (lost motion mechanism) Dt for the rotary shaft and the shift drum 24a is disposed.

The transmission 47 is of the normally meshing type wherein the driving gears 48a to 48f and the driven gears 49a to 49f corresponding to the shift stages are normally held in meshing engagement with each other. The gears are roughly divided into fixed gears which can rotate integrally with the respective support shafts (shafts 28 and 29), free gears relatively rotatable with respect to the respective support shafts, and slide gears integrally rotatable with and movable in the axial directions with respect to the respective shafts.

In particular, the driving gears 48a and 48b are fixed gears, the driving gears 48c and 48d are slide gears, and the driving gears 48e and 48f are free gears. Meanwhile, driven gears 49a to 49d are free gears, and the driven gears 49e and 49f are slide gears. In the following description, the gears 48c, 48d, 49e and 49f are sometimes referred to as slide gears, and the gears 48e, 48f, and 49a to 49d are sometimes referred to as free gears. And, by suitably slidably moving (moving in an axial direction) an arbitrary slide gear by device of the changing mechanism 24, power transmission using a speed change gear pair corresponding to one of the shift stages can be carried out.

On one side of the slide gears 48c and 48d, slide rings Sc and Sd which are integrally rotatable with and movable in axial directions with respect to support shafts therefor similarly to the slide gears 48c and 48d are provided integrally, respectively. The slide rings Sc and Sd are provided adjacent the free gears 48e and 48f in the axial direction, respectively. On the slide rings Sc and Sd, slide side dogs (dowels) D1c and D1d are provided, and on the free gears 48e and 48f, free side dogs (dowels) D1e and D1f corresponding to the slide side dogs D1c and D1d are provided.

Further, on one side of the slide gears 49e and 49f, slide rings Se and Sf which are integrally rotatable with and movable in axial directions with respect to respective support shafts similarly to the slide gears 49e and 49f are provided integrally, respectively. The slide rings Se and Sf are provided adjacent the free gears 49c and 49d in the axial direction, respectively. Slide side dogs (dowels) D2e and D2f are provided on the slide rings Se and Sf, respectively, and free side dogs (dowels) D2c and D2d corresponding to the slide side dogs D2e and D2f are provided on the free gears 49c and 49d, respectively.

Further, on the other side of the slide gears 49e and 49f, slide side dogs (dowels) D3e and D3f are provided, respectively, and on the free side gears 49a and 49b adjacent the slide side dogs D3e and D3f in the axial direction, free side dogs (dowels) D3a and D3b corresponding to the slide side dogs (dowels) D3e and D3f are provided, respectively.

The slide side dogs and the free side dogs are engaged, when the corresponding slide gears (including slide rings) and the free gears approach each other, against relative rotation, and the engagement is canceled when the slide gears and the free gears are spaced away from each other.

Then, when one of the slide gears and a corresponding one of the free gears are engaged against relative rotation with each other through the respective dogs, power transmission selectively using one of the speed change gear pairs is carried out between the main shaft 28 and the countershaft 29. Further, in a state in which the engagement of all of the slide gears and the free gears is canceled (state illustrated in FIG. 5), the power transmission between the shafts 28 and 29 is disabled, and this state is a neutral state of the transmission 47.

The ECU 42 (refer to FIG. 3) controls operation of the twin clutch type speed change gear 23 and the gear shift apparatus 41 based on information from an opening sensor TS for the throttle valve of the throttle body 16, a retraction sensor SS for detecting a retracted state of the side stand, a wheel speed sensor WS for the front wheel 2, and a mode switch SW1, a gear select switch SW2, a neutral-drive changeover switch SW3 and so forth disposed on the steering handle bar 4a or the like, to change the shift stage (shift position) of the transmission 47. Further, the sensor signals are transmitted also to an EFI-ECU 42a for controlling a fuel injection apparatus.

Speed change modes selected by the mode switch SW1 include a full automatic mode in which the shift stage of the transmission 47 is changed over automatically based on vehicle information such as the vehicle speed (wheel speed) and the engine speed, and a semiautomatic mode in which the shift stage of the transmission 47 can be changed over only by a manipulation of the gear select switch SW2 based on a will of the driver. The speed change mode and the shift stage at present are displayed on a meter apparatus M provided in the proximity of the steering handle bar 4a. Further, the transmission 47 can be changed over between a state in which power transmission can be carried out with a predetermined shift stage and a neutral state by a manipulation of the neutral-drive changeover switch SW3.

Referring to FIG. 4, an engine speed sensor SE3 is disposed in the proximity of the primary driven gear 58. Meanwhile, an inner shaft rotational speed sensor SE10 for detecting the rotational speed of the inner shaft 43 is disposed in the proximity of the driving gear 48a, and an outer shaft rotational speed sensor SE11 for detecting the rotational speed of the outer shaft 44 is disposed in the proximity of the driving gear 48b. Further, a countershaft rotational speed sensor SE19 is disposed in the proximity of the countershaft 29. Sensor signals of them are transmitted to the ECU 42 and the EFI-ECU 42a. It is to be noted that the rotational speed sensors can be applied not only to the positions in the example of the present embodiment but can be disposed at various positions at which desired information can be detected.

As shown in FIG. 5, the twin clutch 26 is configured such that the first clutch 51a connected to speed change gear pairs for odd-numbered shift stages is disposed on the right side (outer side in the vehicle widthwise direction) in the clutch case 25 while the second clutch 51b connected to speed change gear pairs for even-numbered shift stages is disposed on the left side (inner side in the vehicle widthwise direction) in the clutch case 25. The clutches 51a and 51b are of the wet multiple disk type having a plurality of clutch plates (clutch plates 61a and 61b and clutch plates 66a and 66b) disposed alternately in the axial direction of the twin clutch 26.

The clutches 51a and 51b are of the hydraulic type wherein pressure plates 52a and 52b are displaced in the axial direction by a hydraulic pressure supplied thereto from the outside to obtain predetermined engaging force. Each of the clutches 51a and 51b includes a return spring 53a or 53b for biasing the pressure plate 52a or 52b toward the clutch disconnection side, a connection side pressure oil chamber 54a or 54b for applying pressing force toward the clutch connection side to the pressure plate 52a or 52b, and a disconnection side pressure oil chamber 55a or 55b for applying pressing force toward the clutch disconnection side to the pressure plate 52a or 52b to assist the returning movement of the pressure plate 52a or 52b.

A comparatively low pressure oil is normally supplied from a main oil pump to the disconnection side pressure oil chambers 55a and 55b while a comparatively high pressure oil is selectively and individually supplied from a pressure oil supplying apparatus 46 (clutch oil pump 32) to the connection side pressure oil chambers 54a and 54b.

The clutches 51a and 51b have a single common clutch outer 56 and are configured with a substantially equal diameter. The clutch outer 56 has a bottomed cylindrical shape that is open rightwardly and is supported at a central portion of the bottom thereof for relative rotation at a leftwardly and rightwardly intermediate portion of the outer shaft 44. A clutch center 57a for the first clutch 51a is disposed on the left inner side of the clutch outer 56 while a clutch center 57b for the second clutch 51b is disposed on the right inner side of the clutch outer 56. The clutch center 57b is supported for integral rotation at a right end portion of the outer shaft 44.

The primary driven gear 58 is attached to the left side of the bottom of the clutch outer 56 with a spring damper 59 interposed therebetween, and the primary driving gear 58a of the crankshaft 21 meshes with the primary driven gear 58. Rotational power of the crankshaft 21 is inputted to the clutch outer 56 through the spring damper 59. The clutch outer 56 rotates separately from the main shaft 28 upon rotation of the crankshaft 21.

On the left side with respect to the primary driven gear 58 on the clutch outer 56, a driving sprocket wheel 56b for driving the oil pumps is provided for integral rotation. On the right side inner circumference of the clutch outer 56, a plurality of clutch plates 61a for the first clutch 51a are supported for integral rotation. Meanwhile, on the left side inner circumference of the clutch outer 56, a plurality of clutch plates 61b for the second clutch 51b are supported for integral rotation.

A plurality of engaging grooves extending in the axial direction are formed on the outer circumference of the clutch outer 56, and a plurality of engaging projections corresponding to the engaging grooves are formed on the inner circumference of the clutch plates 61a and 61b. The engaging projections are engaged against relative rotation with the engaging grooves to support the clutch plates 61a and 61b for integral rotation on the clutch outer 56.

An inner wall 65a erected rightwardly is provided on the left side flange portion 64a of the clutch center 57a of the first clutch 51a, and a plurality of clutch disks (friction plates) 66a are supported for integral rotation on the outer circumference of the inner wall 65a.

A plurality of engaging grooves extending in the axial direction are formed on the outer circumference of the clutch center 57a, and a plurality of engaging projections corresponding to the engaging grooves are formed on the inner circumference of the clutch plates 66a. The engaging projections are engaged against relative rotation with the engaging grooves to support the clutch plates 66a for integral rotation on the clutch center 57.

The pressure plate 52a is disposed in an opposing relationship rightwardly of the flange portion 64a, and the clutch plates 61a and the clutch plates 66a are disposed in an alternately disposed layered state in the axial direction between the outer circumference side of the pressure plate 52a and the outer circumference side of the flange portion 64a.

Between the inner circumference side of the pressure plate 52a and the inner circumference side of the flange portion 64a, the disconnection side pressure oil chamber 55a is formed and the return spring 53a for biasing the pressure plate 52a rightwardly (to the side on which the pressure plate 52a is spaced away from the flange portion 64a, clutch disconnection side) is disposed. Rightwardly of the inner circumference side of the pressure plate 52a, a support flange portion 67a provided on the outer circumference of the right side central tubular portion 62a of the clutch center 57a is disposed in an opposing relationship, and between the support flange portion 67a and the inner circumference side of the pressure plate 52a, the connection side pressure oil chamber 54a is formed and the return spring 53a is disposed.

Meanwhile, an inner wall 65b that is erected rightwardly is provided on a flange portion 64b on the left side of the clutch center 57b of the second clutch 51b, and a plurality of clutch disks 66b are supported for integral rotation on the outer circumference of the inner wall 65b.

A plurality of engaging grooves extending in the axial direction are formed on the outer circumference of the clutch center 57b, and a plurality of engaging projections corresponding to the engaging grooves are formed on the inner circumference of the clutch disks 66b. The engaging projections are engaged against relative rotation with the engaging grooves to support the clutch disks 66b for integral rotation on the clutch center 57b.

A pressure plate 52b is disposed in an opposing relationship rightwardly of the flange portion 64b, and the clutch plates 61b and the clutch disks 66b are disposed in an alternately disposed layered state in the axial direction between the outer circumference side of the pressure plate 52b and the outer circumference side of the flange portion 64b.

Between the inner circumference side of the pressure plate 52b and the inner circumference side of the flange portion 64b, the disconnection side pressure oil chamber 55b is formed and the return spring 53b for biasing the pressure plate 52b rightwardly (toward the side on which the pressure plate 52b is spaced away from the flange portion 64, clutch disconnection side) is disposed. Rightwardly of the inner circumference side of the pressure plate 52b, a support flange portion 67b provided on the outer circumference of the right side central tubular portion 62b of the clutch center 57b is disposed in an opposing relationship, and the connection side pressure oil chamber 54b is formed and the return spring 53b is disposed between the support flange portion 67b and the inner circumference side of the pressure plate 52b.

On a clutch cover 69, which configures the right side of the clutch case 25, the first supply oil path 92a, the second supply oil path 92b and an intra-cover main supply oil path 71a are provided. Oil paths individually communicated with the oil paths 92a, 92b and 71a are formed suitably in a right hollow portion 43a of the inner shaft 43.

By the configuration described above, pressure oil from the clutch oil pump 32 can be supplied to the connection side pressure oil chamber 54b of the second clutch 51b through the first supply oil path 92a and so forth. Further, pressure oil from the main oil pump can be supplied to the disconnection side pressure oil chamber 55a of the first clutch 51a through the intra-cover main supply oil path 71a and so forth. Furthermore, pressure oil from the clutch oil pump 32 can be supplied to the connection side pressure oil chamber 54a of the first clutch 51a through the second supply oil path 92b and so forth, and pressure oil from the main oil pump can be supplied to the disconnection side pressure oil chamber 55b of the second clutch 51b through the main supply oil path 71a and so forth.

In an engine stopping state (stopping state of the oil pumps), each of the clutches 51a and 51b assumes a clutch disconnection state in which the pressure plate 52a or 52b is displaced rightwardly by the biasing force of the return spring 53a or 53b, and the frictional engagement between the clutch plates 61a or 61b and the clutch plates 66a or 66b is cancelled. However, also in an engine operating state, in a state in which pressure oil supply from the pressure oil supplying apparatus 46 is stopped, the biasing force of the return spring 53a or 53b and the oil pressure of the disconnection side pressure oil chamber 55a or 55b act upon the pressure plate 52a or 52b to place the clutch 51a or 51b in a clutch disconnection state similarly as described above. In other words, the twin clutch 26 according to the present embodiment is of the "normally open type" wherein the clutch is in a disconnection state when no control is carried out.

In a state in which the engine is operating and pressure oil of a comparatively high pressure is supplied from the pressure oil supplying apparatus 46 to the connection side pressure oil chamber 54a, the pressure plate 52a in the first clutch 51a is displaced leftwardly (to the flange portion 64a side, the clutch connection side) against the oil pressure of the disconnection side pressure oil chamber 55a and the biasing force of the return spring 53a, and the clutch plates 61a and the clutch plates 66a are pressed toward each other and frictionally engage with each other to establish a clutch connection state in which torque transmission can be carried out between the clutch outer 56 and the clutch center 57a.

Meanwhile, in a state in which the engine is operating and pressure oil of a comparatively high pressure is supplied from the pressure oil supplying apparatus 46 to the connection side pressure oil chamber 54b, the pressure plate 52b in the second clutch 51b is displaced leftwardly (to the flange portion 64b side, the clutch connection side) against the oil pressure of the disconnection side pressure oil chamber 55b and the biasing force of the return spring 53b, and the clutch plates 61b and the clutch disks 66b are pressed toward each other and frictionally engage with each other to establish a clutch connection state in which torque transmission can be carried out between the clutch outer 56 and the clutch center 57b.

Then, if the pressure oil supply to the connection side pressure oil chambers 54a and 54b stops in the clutch connection state of the clutches 51a and 51b, then the pressure plates 52a and 52b are displaced rightwardly by the oil pressure of the disconnection side pressure oil chambers 55a and 55b and the biasing force of the return springs 53a and 53b, whereupon the frictional engagement between the clutch plates 61a, 61b and the clutch plates 66a, 66b is cancelled thereby to establish a clutch disconnection state in which torque transmission between the clutch outer 56 and the clutch centers 57a and 57b is disabled.

The engine oil supplied to the disconnection side pressure oil chambers 55a and 55b of the clutches 51a and 51b is introduced to the outside of the pressure oil chambers through oil paths formed suitably in the inner walls 65a and 65b and so forth, and is suitably supplied to the clutch plates 61a and 61b and the clutch plates 66a and 66b on the outer circumference of the inner walls 65a and 65b. By allowing the working fluid in the disconnection side pressure oil chambers 55a and 55b to escape in this manner, the oil pressure in the disconnection side pressure oil chambers 55a and 55b is kept in a predetermined low pressure state and besides the lubricity and the cooling performance for the clutch plates 61a and 61b and the clutch plates 66a and 66b of the clutches 51a and 51b which are in a disconnection state are improved.

In the twin clutch type speed change gear 23, if it is decided, from that the side stand is erected uprightly or from a like reason, that the motorcycle 1 is in a stopping state even after the engine of the motorcycle 1 is started, both of the clutches 51a and 51b are kept in a disconnection state. Then, for example, if the side stand is accommodated or the switch SW1, SW2 or SW3 is operated, then as preparations for starting of the motorcycle 1, the transmission 47 is placed from a neutral state into a first speed state in which power transmission using the first gear (starting gear, speed change gear pair 45a) can be carried out. For example, if the engine speed rises in this state, then the first clutch 51a is placed into a connection state through a half clutch state and the motorcycle 1 is started.

Upon traveling of the motorcycle 1, one of the clutches 51a and 51b corresponding to the shift position at present is in a connection state while the other remains in a disconnection state. Consequently, power transmission is carried out through one of the inner and outer shafts 43 and 44 and one of the speed change gear pairs 45a to 45f. At this time, the ECU 42 controls operation of the twin clutch type speed change gear 23 based on vehicle information to create in advance a state in which power transmission using a speed change gear pair corresponding to the next shift position can be carried out. In the following description, the operation of creating this state is referred to as "preparatory speed change".

In particular, if the shift position (shift stage) at present is an odd-numbered stage (or an even-numbered stage), since the next shift position is an even-numbered stage (or an odd-numbered stage), preparatory speed change is executed in order to allow power transmission using a speed change gear pair of an even-numbered stage (or an odd-numbered stage). At this time, although the first clutch 51a is in a connection state, since the second clutch 51b (or the first clutch 51a) is in a disconnection state, engine output power is not transmitted to the outer shaft 44 (or the inner shaft 43) and the speed change gear pairs of the even-numbered stages (or the odd-numbered stages).

Thereafter, if the ECU 42 decides that a shift timing comes, then only by placing the first clutch 51a (or the second clutch 51b) into a disconnection state and placing the second clutch 51b (or the first clutch 51a) into a connection state, the power transmission is changed over to the power transmission in which the speed change gear pair corresponding to the next shift position selected in advance is used. Consequently, quick and smooth speed change can be carried out without giving rise to a time lag or interruption of power transmission upon speed change.

Further, the twin clutch type speed change gear 23 is configured such that, upon normal traveling in which a fixed shift stage is used, pressure oil of very low pressure is supplied to the connection side pressure oil chamber of the clutch (51a or 51b), which is in a disconnection state, so that the clutch operates a very small amount to the clutch connection side. This very low oil pressure corresponds to an oil pressure higher than a minimum pressure necessary to absorb a mechanical play of the clutch, or in other words, to an oil pressure higher than a pressure corresponding to the force of the return spring of the clutch.

Upon normal operation with the shift stage fixed, in the clutch in the connection state (connection side clutch), the parts on the crankshaft 21 side (parts that rotate integrally with the primary driven gear 58, that is, the clutch outer 56, the clutch plates 61a or 61b and so forth) and the parts on the transmission 47 side (parts that rotate integrally with the main shaft 28, that is, the clutch center 57a or 57b, the clutch plates 66a and 66b and so forth) rotate integrally with each other. On the other hand, in normal operation, the parts on the crankshaft 21 side in the clutch in the disconnection state (disconnection side clutch) rotate idly with respect to the parts on the transmission 47 side which are in a stopping state.

In each of the clutches 51a and 51b, when driving force (torque) is not transmitted, a mechanical play (clearance) in the rotational direction exists between the engaging grooves on the outer circumference of the clutch outer 56 and the engaging projections on the outer circumference of the clutch plates 61a and 61b and between the engaging groves on the outer circumference of the clutch centers 57a and 57b and the engaging projections on the inner circumference of the clutch plates 66a and 66b. However, by causing the clutch in the disconnection state to be moved by a small amount to the clutch connection side as described above, very low torque is applied from the parts on the crankshaft 21 side to the parts on the transmission 47 side. Consequently, the play in the rotational direction can be absorbed, and generation of sound upon normal operation based on the play can be suppressed.

Figure 7:
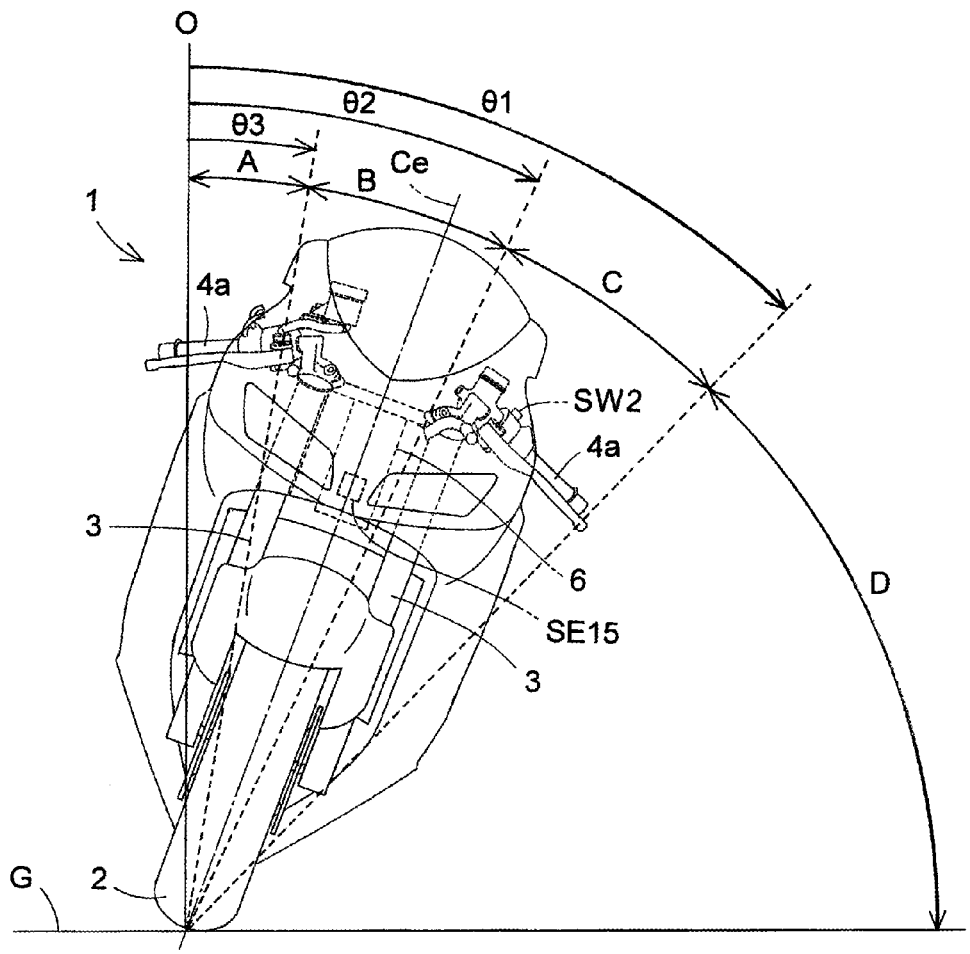
FIG. 7 is an explanatory view illustrating a relationship between a roll angle of a vehicle body and a speed change controlling pattern.

FIG. 7 is a schematic view illustrating a relationship between the roll angle of the vehicle body and the speed change control pattern. Like reference symbols to those described hereinabove denote like or equivalent elements. To the motorcycle 1, an angle sensor SE15 as roll angle detection device is attached at a position of the head pipe 6 on the vehicle front side. The angle sensor SE15 formed from a gyro sensor is configured for detection of the inclination of the vehicle body center line Ce with reference to a vertical line O with respect to a horizontal road surface G, that is, the roll angle θ as an inclination angle of the vehicle body with respect to the gravity direction.

Then, the clutch controlling apparatus according to the present embodiment can arbitrarily adjust the connection/disconnection speed of the first clutch 51a and the second clutch 51b as described hereinabove. In particular, the switching speed between the clutches can be increased or decreased by changing, upon speed change operation by switching between the clutches, the speed at which one of the clutches which has been in a connection state is disconnected and the speed at which the other which has been in a disconnection state is connected.

The speed change controlling apparatus according to the present embodiment is characterized in that, in a "region D" in which the roll angle θ of the vehicle body exceeds a second roll angle θ1, the speed change operation is inhibited, but if a speed changing request is received in another region in which the roll angle θ is smaller than the second roll angle θ1, then a speed change operation by a speed change controlling pattern in which the variation of the driving force with respect to time is smaller than that in a speed change controlling pattern in ordinary operation is executed. This speed change control can be executed similarly in both of a full automatic mode in which the gear stage number is automatically changed over in response to the vehicle speed or the engine speed and a semiautomatic mode in which the gear stage number is changed over based on a speed changing switch operation of an occupant.

It is to be noted that the "speed changing request" described above is, in the semiautomatic mode, an operation of the gear select switch SW2 disposed adjacent the steering handle bar 4a by the occupant, and in the full automatic mode, an automatic speed changing timing based on a speed change map stored in the ECU 42.

Speed change control according to the present embodiment is described. The control section 42 does not carry out normal speed change operation in a region in which the roll angle θ exceeds the second roll angle θ1. More particularly, in the region D in which the roll angle θ is in a full bank state or exceeds the second roll angle θ1, which corresponds to a case in which some part of the vehicle contacts with the road surface, even if a speed changing request is received, the speed change operation is inhibited. Such a second roll angle as described above is in most cases a substantially middle of turning, that is, a substantially middle of a radius of cornering in a turning state. It is to be noted that, if the vehicle speed increases, then since the suspension is contracted, the roll angle θ1 at which some part of the vehicle body is grounded decreases. Accordingly, the second roll angle θ1 may be set variably in response to a table determined with reference to a vehicle speed.

If a speed changing request is issued in a "region C" from the first roll angle θ2 to the second roll angle θ1 greater than the first roll angle θ2, then speed change operation is carried out by soft speed change control in which the variation of the driving force with respect to time is smaller than that by the normal speed change control. It is better to set the first roll angle θ2 to a roll angle at a point of time of starting of general turning (for example, 30 to 40 degrees), and it is possible to execute the speed change (shift down) at an initial stage of turning in a state in which speed change is inhibited conventionally while reducing a speed change shock. Further, a region from the first roll angle θ2 to the roll angle zero corresponds also to a roll angle at a point of time of a rise of cornering in the latter half of the turning, and it is possible to execute, even during turning, speed change (shift up) at a point of time of a rise of cornering without any speed change shock.

On the other hand, if a speed changing request is received in a "region A" from the uprightly standing state in which the roll angle θ is zero to a third roll angle θ3 smaller than the first roll angle θ2, then speed change operation is carried out by direct speed change control in which the variation of the driving force with respect to time is greater than that by the normal speed change control. If a speed changing request is received in a "region B" between the third roll angle θ3 and the first roll angle θ2, then speed change operation is carried out by the normal speed change control.

Since the direct speed change carried out within a range of the roll angle from 0 (zero) to θ3 can reduce the speed change time from that in an ordinary case, particularly it is preferable to adopt the direct speed change in such a driving state as an acceleration state upon a rise of cornering in the latter half of turning or a maximum acceleration state with a fully open throttle condition. Further, the control is entered preferably after a rising decision in a roll angle history for detecting a rise at a corner or the state decision is carried out from such a composite condition that the throttle has an opening higher than a predetermined level.

Figure 8:
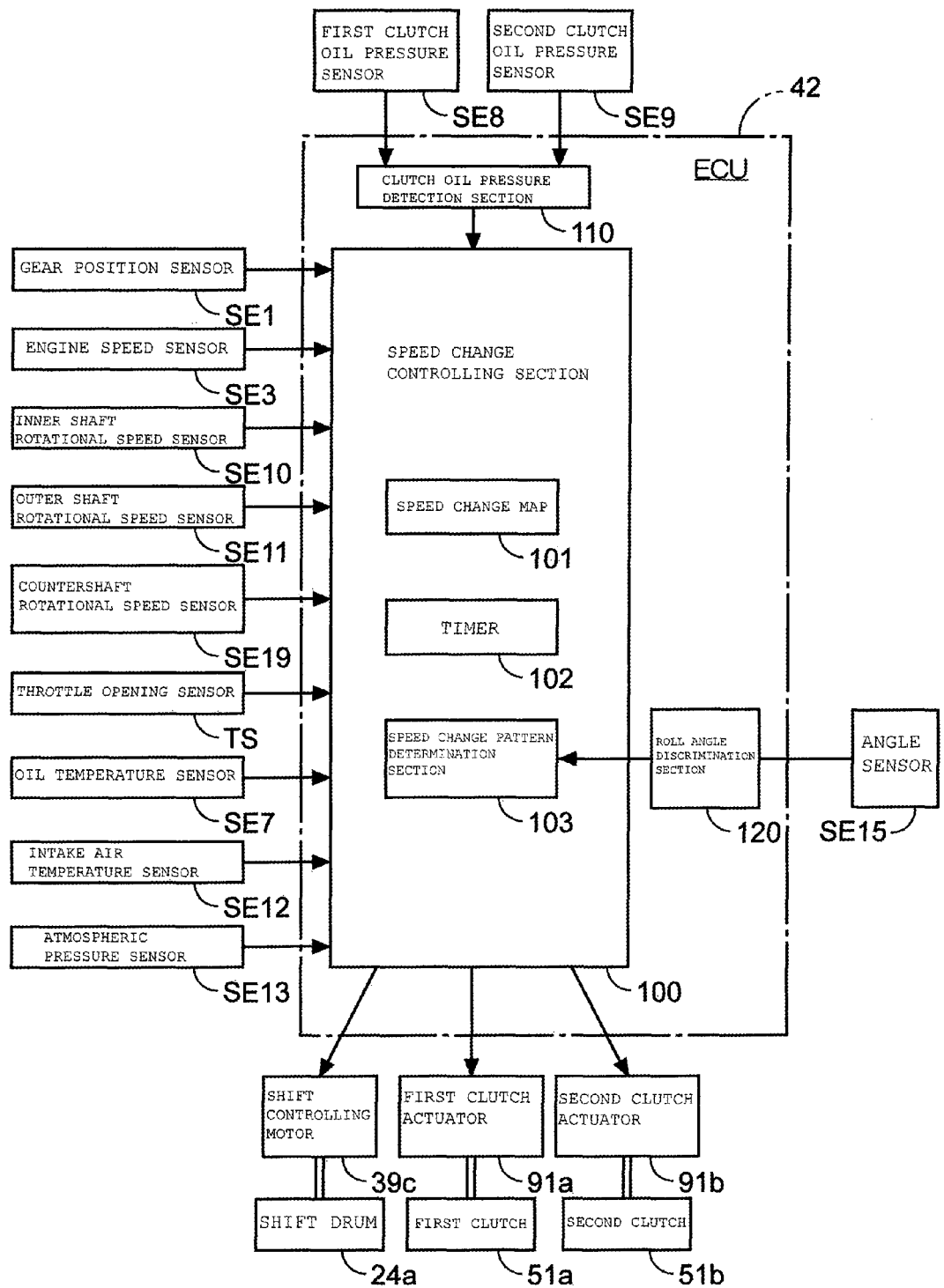
FIG. 8 is a block diagram showing a configuration of an ECU (control section) and peripheral equipments of the ECU.

FIG. 8 is a block diagram showing a configuration of the ECU 42 and peripheral equipments. Like reference symbols to those described hereinabove denote like or equivalent elements. The ECU 42 includes a speed change controlling section 100, a clutch oil pressure detection section 110 and a roll angle discrimination section 120. The speed change controlling section 100 includes a speed change map 101, a timer 102 and a speed change pattern determination section 103. The timer 102 carries out time measurement for calculating the engine speed and various measurements such as measurement of a period of time required for a speed change operation. The speed change pattern determination section 103 determines, when a speed changing request is received, which one of the controls of speed change inhibition, normal speed change, soft speed change and direct speed change should be applied based on the roll angle θ of the motorcycle 1 decided by the roll angle discrimination section 120.

To the speed change controlling section 100, signals from the gear position sensor SE1, engine speed sensor SE3, inner shaft rotational speed sensor SE10, outer shaft rotational speed sensor SE11, countershaft rotational speed sensor SE19, throttle opening sensor TS, oil temperature sensor SE7, intake air temperature sensor SE12 and atmospheric pressure sensor SE13 are inputted. Further, signals from the first clutch oil pressure sensor SE8 and the second clutch oil pressure sensor SE9 are inputted to the speed change controlling section 100 through the clutch oil pressure detection section 110.

Upon normal traveling of the vehicle, the speed change controlling section 100 drives the shift controlling motor 39c, first clutch actuator 91a and second clutch actuator 91b to execute speed change operation in accordance with the speed change map 101 formed from a three-dimensional map or the like based on the gear position sensor SE1, engine speed sensor SE3, throttle opening sensor TS and vehicle speed information. On the other hand, in automatic speed change control (full automatic) in accordance with the speed change map 101 and semiautomatic speed change control (semiautomatic) by an operation of the gear select switch SW2, the speed change controlling section 100 carries out also detection of a speed change state such as "a speed change signal is issued and speed change is being carried out."

The roll angle discrimination section 120 calculates the roll angle $\theta$ based on an output signal of the angle sensor SE15. The speed of the clutch switching control by the twin clutch type speed change gear 23 can be calculated from output values of the first clutch oil pressure sensor SE8 and the second clutch oil pressure sensor SE9 and a measured value by the timer 102. Further, the speed of the clutch switching control can be calculated also from a variation of a rate of rotation between the input and the output of the speed change gear determined from an output value of the inner shaft rotational speed sensor SE10 or the outer shaft rotational speed sensor SE11 and an output value of the countershaft rotational speed sensor SE19, and a measured value by the timer 102.

Figure 9:
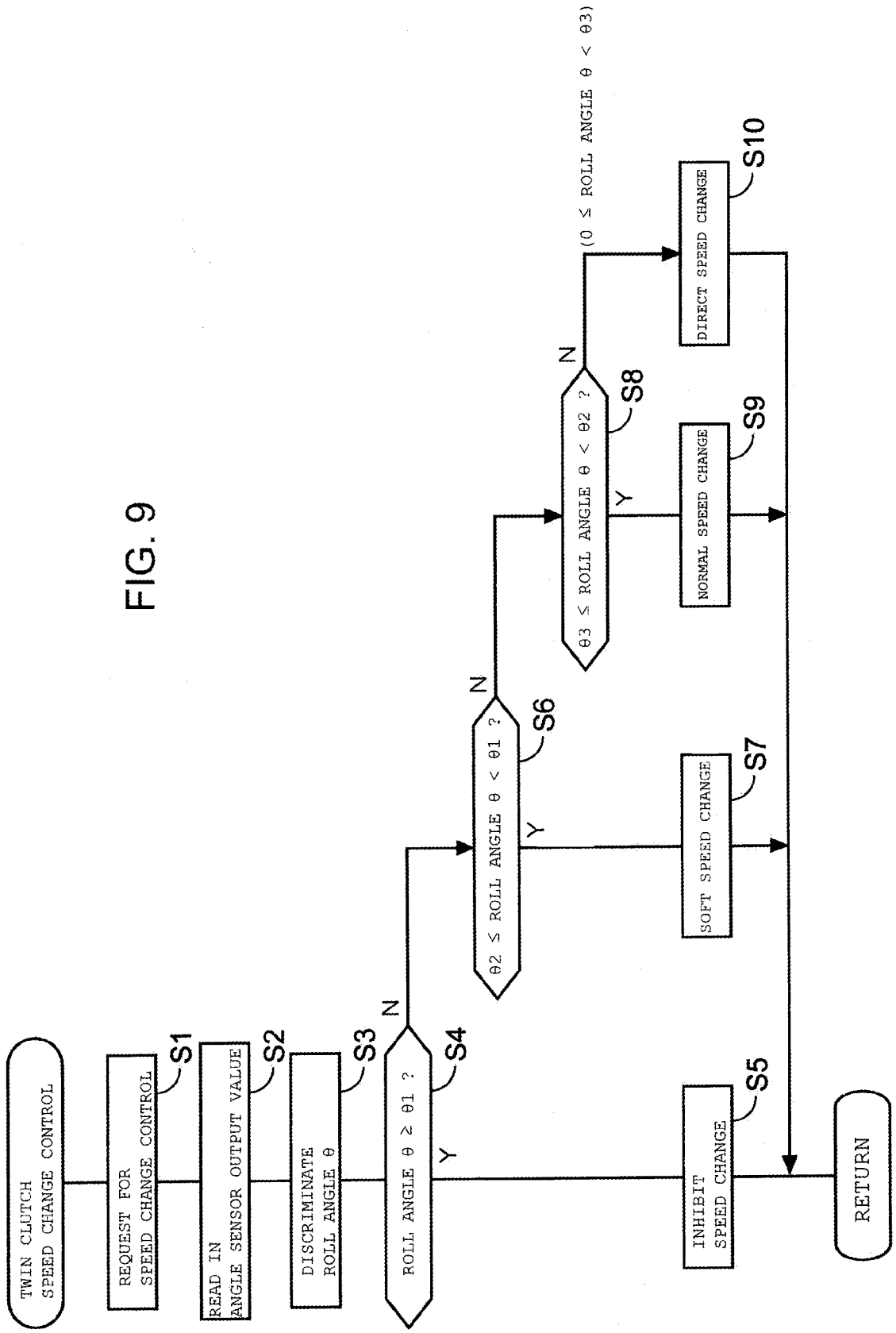
FIG. 9 is a flow chart illustrating a procedure of speed change control by the speed change controlling apparatus according to the present invention.

FIG. 9 is a flow chart illustrating a procedure of the speed change control by the speed change controlling apparatus according to the present invention. If a speed change controlling request is received at step S1, then the processing advances to step S2, at which an output value of the angle sensor SE15 is read in. At subsequent step S3, the roll angle $\theta$ of the vehicle body is decided by the roll angle discrimination section 120 (refer to FIG. 8) based on the output value of the angle sensor SE15.

At step S4, it is decided whether or not the roll angle $\theta$ is equal to or greater than the second roll angle $\theta 1$. If an affirmative decision is made at step S4, then the processing advances to step S5, at which the speed change operation is inhibited, thereby ending the series of controls.

On the other hand, if a negative decision is made at step S4, then the processing advances to step S6, at which it is decided whether or not the roll angle $\theta$ is equal to or greater than the first roll angle $\theta 2$ and smaller than the second roll angle $\theta 1$. If an affirmative decision is made at step S6, then the processing advances to step S7, at which speed change operation in accordance with the soft speed change pattern is executed, thereby ending the series of controls.

If a negative decision is made at step S6, then the processing advances to step S8, at which it is decided whether or not the roll angle $\theta$ is equal to or greater than the third roll angle $\theta 3$ and smaller than the first roll angle $\theta 2$. If an affirmative decision is made at step S8, then the processing advances to step S9, at which speed change operation in accordance with the normal speed change pattern is executed, thereby ending the series of controls.

However, if a negative decision is made at step S8, then it is determined that the roll angle $\theta$ is greater than 0 and besides is smaller than the third roll angle $\theta 3$ and the processing advances to step S10, at which speed change operation in accordance with the direct speed change pattern is executed, thereby ending the series of controls.

Figure 10:
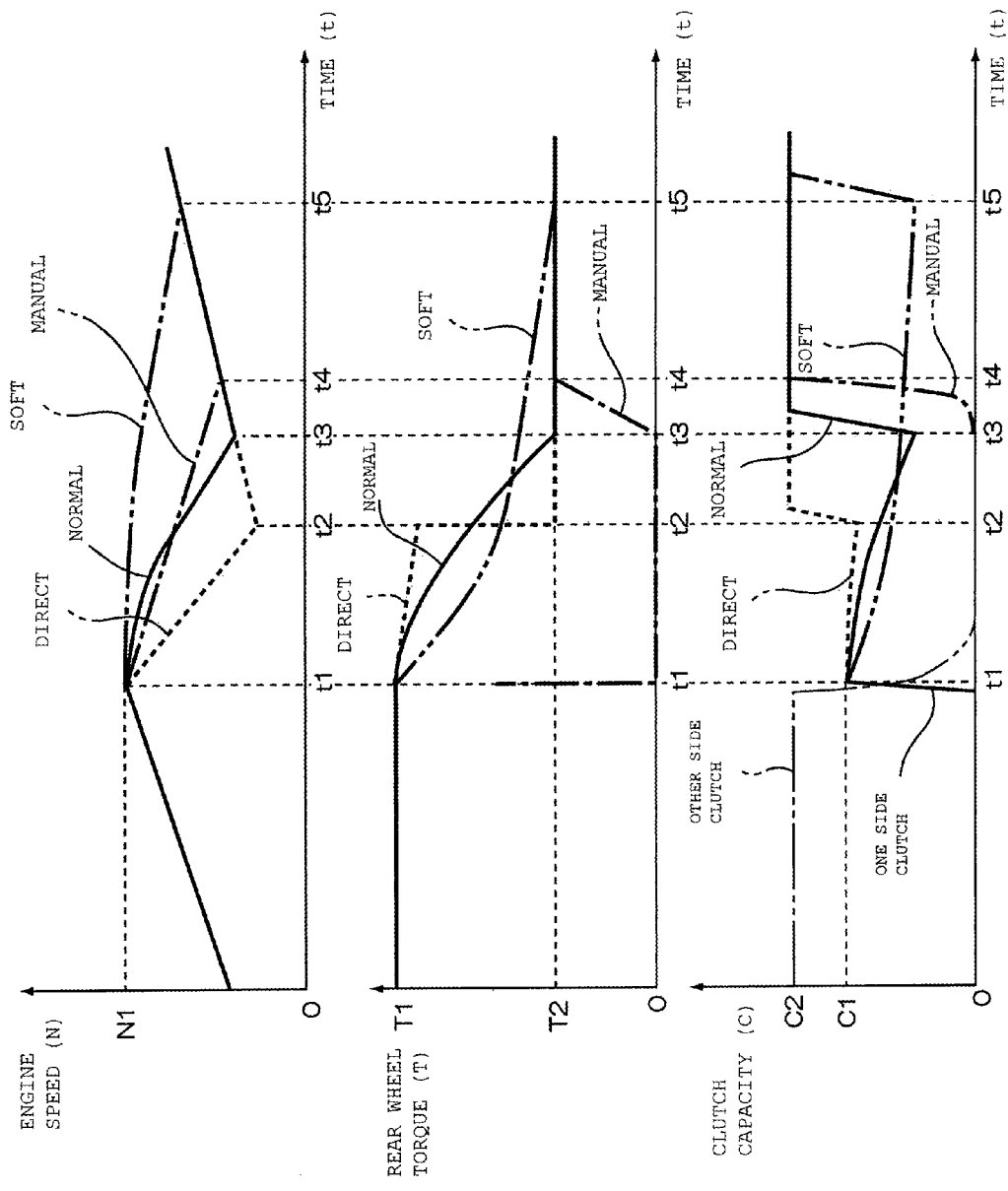
FIG. 10 is a time chart illustrating a flow of the speed change control where a normal speed change pattern, a soft speed change pattern and a direct speed change pattern are selected.

FIG. 10 is time charts illustrating flows of speed change control in the case where the normal speed change pattern, soft speed change pattern and direct speed change pattern are selected. In the figures, a transition of the engine speed, a transition of the rear wheel torque and a transition of the clutch capacity upon shift up speed change are illustrated in order from above.

First, if attention is paid to the transition of the engine speed, then when speed change operation in accordance with a shift up request is started at time t1 during acceleration with a predetermined gear, in the normal speed change (solid line), the engine speed drops comparatively moderately from the engine speed N1, and at time t3, the clutch is placed into a full connection state (completion of clutch switching operation). Thereafter, the engine speed rises in an in-gear state after the shift up. In contrast, in the case of the soft speed change (alternate long and two short dashes line), after speed change operation in accordance with a shift up request is started at time t1, the engine speed starts its drop with a moderateness much higher than that in the normal speed change from the engine speed N1. Then, at time t5 later than time t3, the clutch is placed into a full connection state. Further, in the case of the direct speed change (broken line), after speed change operation in accordance with a shift up request is started at time t1, the engine speed starts its drop more suddenly and linearly than that in the normal speed change from the engine speed N1. Then at time t2 earlier than time t3, the clutch is placed into a full connection state. It is to be noted that also an example in which a manual transmission is manually operated by an occupant is shown in the graph. In the case of manual speed change (alternate long and short dash line), the engine speed drops comparatively moderately and linearly from the engine speed N1, and the clutch enters a full connection state at time t4 between time t3 and time t5.

Next, the transition of the rear wheel torque indicates that of a case in which speed change operation in accordance with a shift up request is started at time t1 at which rear wheel torque T1 is generated during acceleration with a predetermined gear. In the normal speed change (solid line), the rear wheel torque drops comparatively moderately drawing a curve which is convex upwardly from the rear wheel torque T1, and the clutch enters a full connection state (completion of clutch switching operation) at time t3 and the rear wheel torque transits to rear wheel torque T2. In contrast, in the case of the soft speed change (alternate long and two short dashes line), after speed change operation in accordance with a shift up request is started at time t1, the rear wheel torque starts its drop moderately drawing a curve which is convex downwardly. Then at time t5, the clutch enters a full connection state. Further, in the case of the direct speed change (broken line), after speed change operation in accordance with a shift up request is started at time t1, the rear wheel torque begins to drop linearly, and the clutch enters a full connection state rapidly at time t2 earlier than time t3. It is to be noted that, in the case of manual speed change (alternate long and short dash line), the clutch enters a torque missing state at time t1 by disconnection of the clutch, and the rear wheel torque rises suddenly in the proximity of time t3. Then at time t4 between time t3 and time t5, the clutch enters a full connection state.

Finally, the transition of the clutch capacity illustrates that in a case in which speed change operation in accordance with a shift up request is started at time t1 at which the other side clutch is in a connection state by the clutch capacity C2. At time t1, the clutch capacity C2 of the other side clutch already starts its drop in accordance with the speed changing request, and in place of this, the one side clutch which has been in a disconnection state is configured such that the clutch capacity is raised suddenly to a clutch capacity C1 as preparations for clutch switching operation. A difference among the normal speed change, soft speed change and direct speed change appears after time t1.

Regarding the clutch capacity of the one side clutch, in the normal speed change (solid line), the clutch capacity drops comparatively moderately from the clutch capacity C1 and then rises at time t3, then the clutch is placed into a full connection state, and the clutch capacity thereby transits to the clutch capacity C2. In contrast, in the case of the soft speed change (alternate long and two short dashes line), after speed change operation in accordance with a shift up request is started at time t1, the clutch capacity drops moderately drawing a curve which is convex downwardly. Thereafter, the clutch capacity rises at time t4 and the clutch is placed into a full connection state. Further, in the case of the direct speed change (broken line), after speed change operation in accordance with a shift up request is started at time t1, the clutch capacity drops a little, whereafter it rises quickly at time t2 earlier than time t3 and the clutch is placed into a full connection state. It is to be noted that, in the case of manual speed change (long and short dash line), the clutch capacity is placed into a zero state by disconnection of the clutch from time t1. Then, after time t3, the clutch capacity rises suddenly in the proximity of time t3, and the clutch is placed into a full connection state at time t4 between time t3 and time t5.

As described above, the switching speed of the clutch is interlocked with a timing at which the clutch capacity is caused to rise in order to connect the clutch. The timing at which the clutch capacity is to rise is set so as to become later in the order of the direct speed change→normal speed change→soft speed change, and as the roll angle increases, the clutch switching speed becomes slower.

It is to be noted that, while, in this figure, the transitions in the case where the speed changing request is shift up are illustrated, even where the speed changing request is shift down, the magnitude of the driving force variation upon speed change is controlled such that it exhibits a relationship of the soft speed change<normal speed change<direct speed change similarly.

As described above, with the speed change controlling apparatus for a motorcycle according to the present invention, when a speed changing request is received, where the roll angle θ of the vehicle body is greater than the second roll angle θ1 (for example, 45 degrees) which corresponds to a full bank state, inhibition of the speed change is applied; when the roll angle θ is between the second roll angle θ1 and the first roll angle θ2 (for example, between 45 to 20 degrees), the soft speed change is applied; when the roll angle θ is between the first roll angle θ2 and the third roll angle θ3 (for example, between 20 and 10 degrees), the normal speed change is applied; and when the roll angle θ is between that in the uprightly standing state and the third roll angle θ3, the direct speed change is applied, to execute speed change operation. Therefore, preferred speed change control in accordance with the roll angle of the vehicle body can be executed.

More particularly, when the roll angle θ of the vehicle body is greater than the second roll angle θ1 which corresponds to a full bank state, the speed change is inhibited, but when the roll angle θ is between the second roll angle θ1 and the first roll angle θ2, speed change operation is carried out by the soft speed change control in which the variation of the driving force with respect to time is smaller than that in the normal speed change control thereby to prevent occurrence of a driving force variation by speed change in a state in which the vehicle body banks by a great amount. On the other hand, in a roll angle region in which the operation burden on the driver does not become so high that the speed change operation is inhibited, speed change control in which the variation of the driving force with respect to time is small is carried out. By this, a speed changing request of the driver can be satisfied as far as possible while the operation burden on the driver is reduced.

Figure 11:
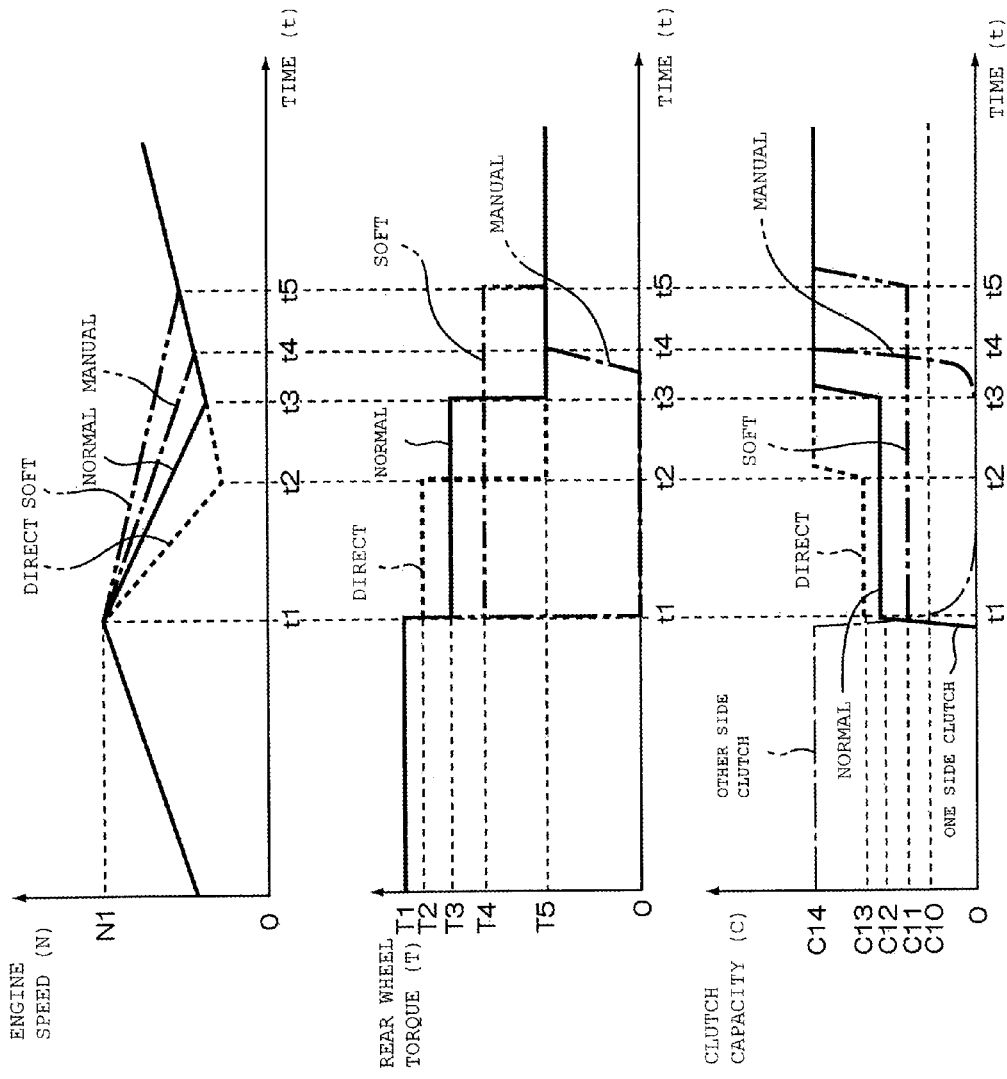
FIG. 11 is a time chart showing a modification to the normal speed change pattern, soft speed change pattern and direct speed change pattern.

FIG. 11 is time charts illustrating a modification to the normal speed change pattern, soft speed change pattern and direct speed change pattern. Also in the figures, a transition of the engine speed, a transition of the rear wheel torque and a transition of the clutch capacity upon shift up speed change are illustrated in order from above.

First, if attention is paid to the transition of the engine speed, then when speed change operation in accordance with a shift up request is started at time t1 during acceleration with a predetermined gear, in the normal speed change (solid line), the engine speed drops comparatively moderately and linearly from the engine speed N1, and at time t3, the clutch is placed into a full connection state (completion of clutch switching operation). Thereafter, the engine speed rises in an in-gear state after the shift up. In contrast, in the case of the soft speed change (alternate long and two short dashes line), after speed change operation in accordance with a shift up request is started at time t1, the engine speed starts its drop linearly with a moderateness much higher than that in the normal speed change from the engine speed N1. Then, at time t5 later than time t3, the clutch is placed into a full connection state. Further, in the case of the direct speed change (broken line), after speed change operation in accordance with a shift up request is started at time t1, the engine speed starts its drop more suddenly and linearly than that in the normal speed change from the engine speed N1. Then at time t2 earlier than time t3, the clutch is placed into a full connection state. It is to be noted that, in the case of manual speed change (alternate long and short dash line), the engine speed drops comparatively moderately and linearly from the engine speed N1, and the clutch enters a full connection state at time t4 between time t3 and time t5.

Next, the transition of the rear wheel torque indicates that of a case in which speed change operation in accordance with a shift up request is started at time t1 at which rear wheel torque T1 is generated during acceleration with a predetermined gear. In the present embodiment, clutch control is executed such that the rear wheel torque varies stepwise. In the normal speed change (solid line), after speed change operation in accordance with a shift up request is started at time t1, the rear wheel torque is dropped from the rear wheel torque T1 to rear wheel torque T3 and is kept at the rear wheel torque T3 for a predetermined period of time. At time t3, the clutch enters a full connection state (completion of clutch switching operation) and the rear wheel torque transits to rear wheel torque T5. In contrast, in the case of the soft speed change (alternate long and two short dashes line), the rear wheel torque is dropped to rear wheel torque T4, which is lower than the rear wheel torque T3, and is kept at the rear wheel torque T4 for a predetermined period of time. Thereafter, the clutch enters a full connection state at time t5. Further, in the case of the direct speed change (broken line), after the rear wheel torque is dropped to the rear wheel torque T2 higher than the rear wheel torque T3 and is kept at the rear wheel torque T2 for a predetermined period of time, the clutch enters a full connection state rapidly at time t2 earlier than time t3. It is to be noted that, in the case of manual speed change (alternate long and short dash line), the clutch enters a torque missing state at time t1 by disconnection of the clutch, and the rear wheel torque rises suddenly after time t3 passes. Then at time t4 between time t3 and time t5, the clutch enters a full connection state.

Finally, the transition of the clutch capacity illustrates that in a case in which speed change operation in accordance with a shift up request is started at time t1 at which the other side clutch is in a connection state by the clutch capacity C14. At time t1, the clutch capacity C14 of the other side clutch already starts its drop in accordance with the speed changing request, and in place of this, the one side clutch, which has been in a disconnection state, is configured such that the clutch capacity is raised suddenly as preparations for clutch switching operation.

Regarding the clutch capacity of the one side clutch, in the normal speed change (solid line), the clutch capacity is kept at a clutch capacity C12 for a fixed period of time, and then rises at time t3 and the clutch enters a full connection state. Then, the clutch capacity transits to a clutch capacity C14. In contrast, in the case of the soft speed change (alternate long and two short dashes line), after the clutch capacity is kept at a clutch capacity C11, which is smaller than the clutch capacity C12, for a predetermined period of time, the clutch capacity rises at time t5 later than time t3 and the clutch enters a full connection state. Further, in the case of the direct speed change (broken line), the clutch capacity is kept at a clutch capacity C13, which is greater than the clutch capacity C12, for a predetermined period of time, and then at time t2 earlier than time t3, the clutch capacity rises quickly and the clutch enters a full connection state. It is to be noted that, in the case of manual speed change (long and short dash line), the clutch capacity rises suddenly after time t3 passes from a torque missing state, and then at time t4 between time t3 and time t5, the clutch enters a full connection state.

Figure 12:
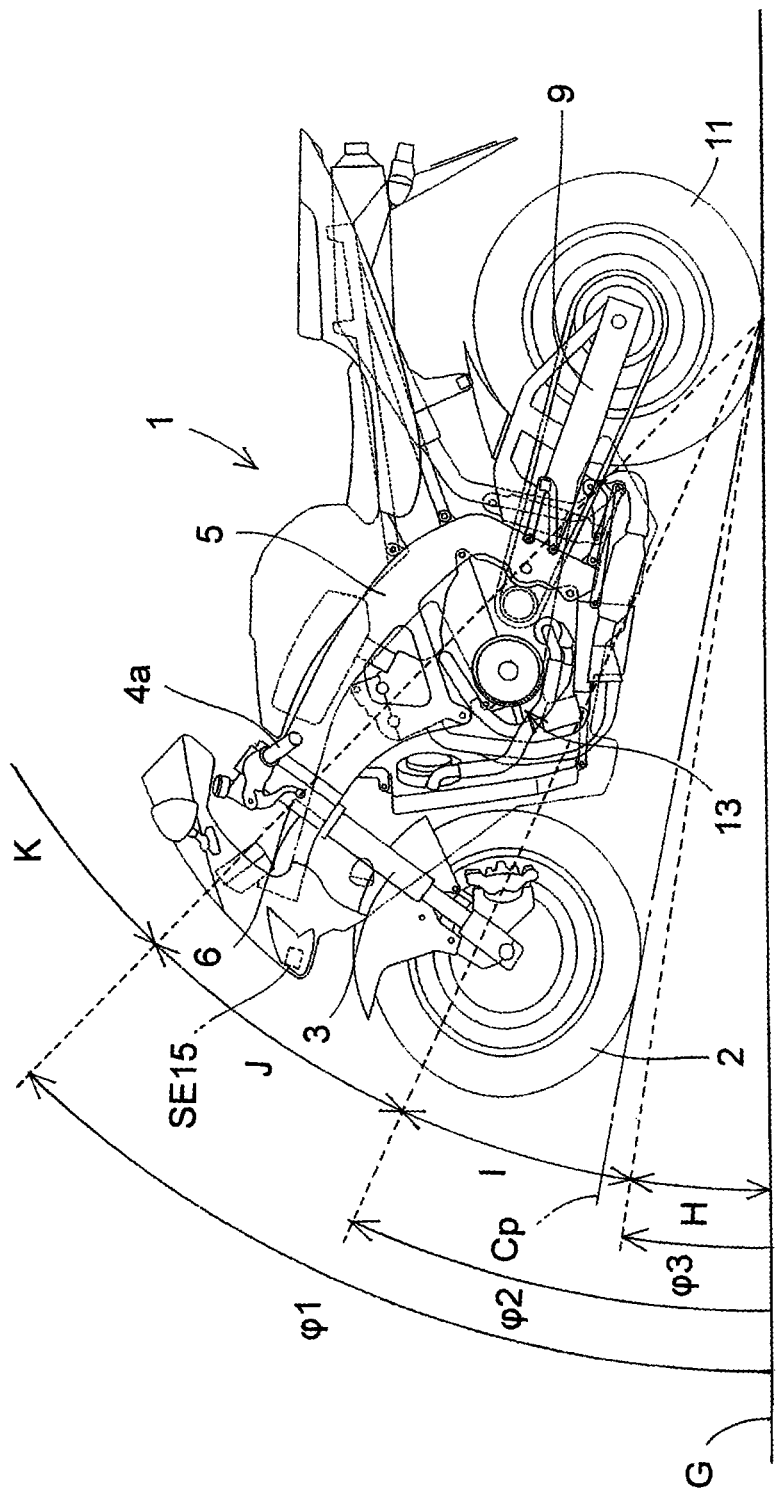
FIG. 12 is an explanatory view illustrating a relationship between a pitch angle of the vehicle body and the speed change control pattern.

FIG. 12 is an explanatory view illustrating a relationship between the pitch angle of the vehicle body and the speed change controlling pattern. Like reference symbols to those described hereinabove denote like or equivalent elements. Control of changing the speed change pattern in response to the inclination angle of the vehicle body can be executed also in response to the pitch angle of the vehicle body. The angle sensor SE15 formed from a gyro sensor is configured for detection of an inclination angle of the vehicle body center line Cp in the forward and backward direction of the vehicle body with respect to the horizontal road surface G, which is caused by a so-called Wheelie state in which the front wheel 2 is spaced away from the road surface G by driving force of the rear wheel 11, that is, the pitch angle $\phi$.

Speed change control according to the present embodiment is described particularly. In a region K in which the pitch angle $\phi$ exceeds a second pitch angle $\phi 1$, even when a speed changing request is received, the control section 42 inhibits the speed change operation. On the other hand, if a speed changing request is received in a "region J" from a first pitch angle $\phi 2$, which is smaller than the second pitch angle $\phi 1$, to the second pitch angle $\phi 1$, then speed change operation is carried out by the soft speed change control in which the variation of the driving force with respect to time is smaller than that by normal speed change control.

Further, if a speed changing request is received in a "region H" from an uprightly standing state, in which the pitch angle $\phi$ is zero, to a third pitch angle $\phi 3$, which is smaller than the first pitch angle $\phi 2$, then speed change operation is carried out by direct speed change control in which the variation of the driving force with respect to time is greater than that by the normal speed change control. Then, if a speed changing request is received in a "region I" between the third pitch angle $\phi 3$ and the first pitch angle $\phi 2$, then speed change operation is carried out by the normal speed change control. It is to be noted that it is possible to execute the changing control of the speed change pattern in accordance with the pitch angle $\phi$ in combination with the speed change control of the speed change pattern in accordance with the roll angle $\theta$.

Figure 13:
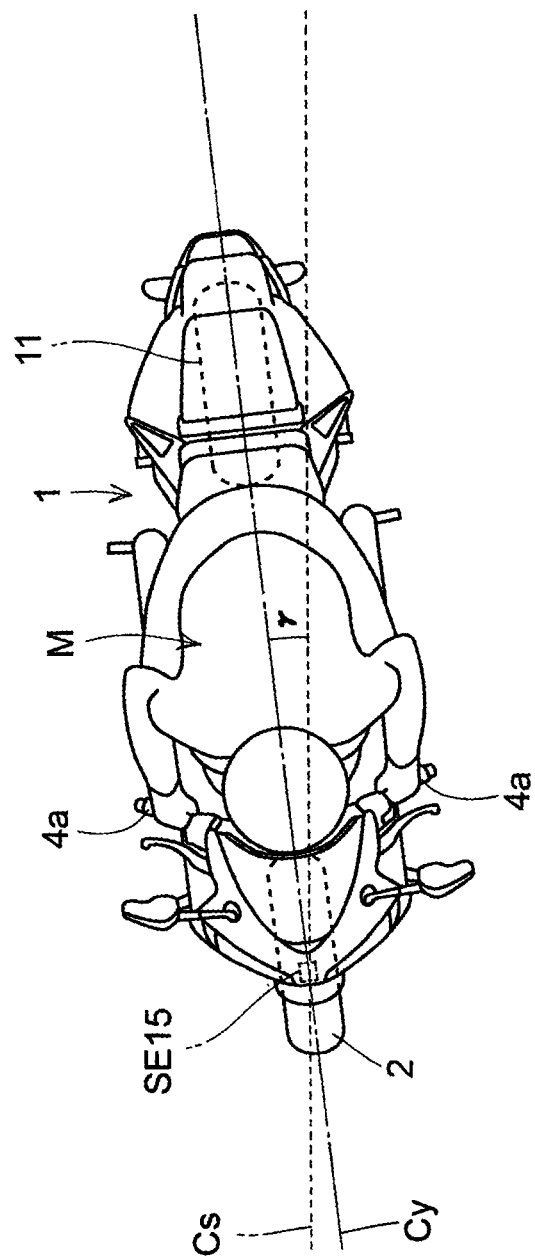
FIG. 13 is an explanatory view of a yaw angle which appears with the vehicle body; and, FIG. 14 is a flow chart illustrating a procedure of soft speed change control taking the yaw angle into consideration.

FIG. 13 is an explanatory view of a yaw angle generated on the vehicle body. Like reference symbols to those described hereinabove denote like or equivalent elements. On the vehicle body of the motorcycle 1, a yaw angle $\gamma$ is generated upon cornering (turning) traveling. Where the rotational angle around an x axis directed in the forward and backward direction of the vehicle body is represented as the roll angle $\theta$ and the rotational angle around a y axis directed in the vehicle widthwise direction is represented as the pitch angle $\phi$, the yaw angle $\gamma$ corresponds to a rotational angle around a z axis directed in the upward and downward direction of the vehicle body. By detecting the yaw angle $\gamma$, not only it is possible to decide whether the motorcycle 1 is in a straightforwardly advancing state or a corner traveling state, but by taking also a variation of the roll angle into consideration, it is possible to decide whether the motorcycle 1 is in an advancing state to a corner or in an escaping state from a corner.

Figure 14:
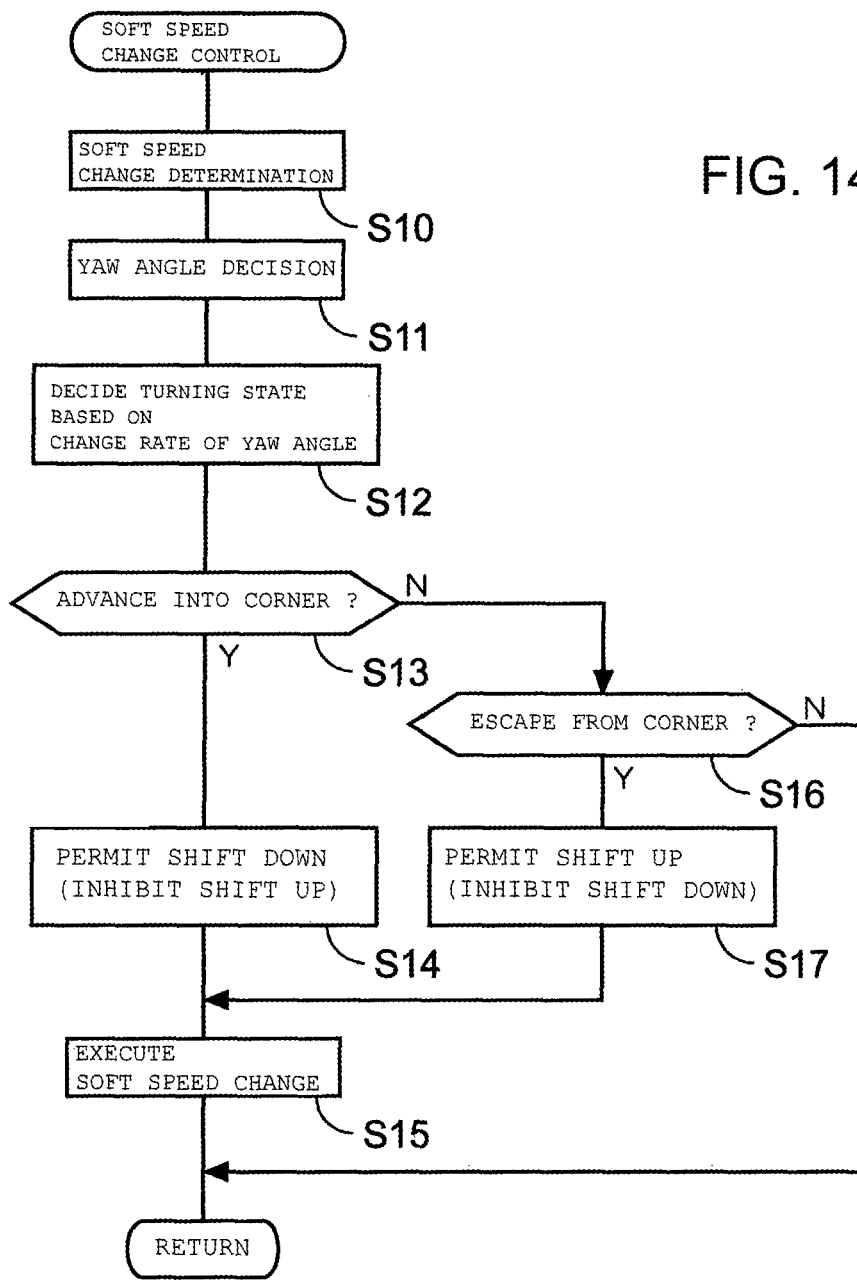

FIG. 14 is a flow chart illustrating a procedure of the soft speed change control where the yaw angle $\gamma$ is taken into consideration. This control is executed after the soft speed change control is selected at step S7 of the flow chart shown in FIG. 9. If the soft speed change control is determined at step S10, then a decision of the yaw angle $\gamma$ is executed at step S11. At subsequent step S12, a decision of the turning (cornering) state is carried out based on a change rate of the yaw angle $\gamma$. At step S12, it can be decided, for example, that the motorcycle 1 is advancing to a corner when the change rate of the yaw angle exceeds a predetermined value together with increase of the roll angle $\theta$, but it can be decided that the motorcycle 1 is escaping from a corner when the rate of the change of the yaw angle exceeds a predetermined value together with decrease of the roll angle $\theta$. Further, the time of advance into or escapement from a corner can be determined such that, when the yaw angle $\gamma$ increases together with increase of the roll angle $\theta$, it is decided that this is the time of advance into a corner, but on the other hand, when the yaw angle $\gamma$ decreases together with decrease of the roll angle $\theta$, it is decided that this is the time of escapement from a corner. Increase or decrease of the yaw angle $\gamma$ can be recognized, for example, by storing the yaw angle $\gamma$ as a reference value when the roll angle $\theta$ reaches a predetermined value.

At step S13, it is decided whether or not the present time is the time of advance into a corner. If an affirmative decision is made at step S13, then the processing advances to step S14, at which only shift down from among the speed change operations is permitted. Thereafter, the processing advances to step S15, at which the soft speed change control is executed in the shift up inhibition state. This process prevents, normally upon advance to a corner, shift up from being carried out by a wrong speed change operation because there is no necessity for shift up.

On the other hand, if a negative decision is made at step S13, then the processing advances to step S16, at which it is decided whether or not the time at present is the time of escapement from a corner, and if an affirmative decision is made, then the processing advances to step S17. At step S17, only shift up is permitted from among the speed change operations, and then the processing advances to step S15, at which the soft speed change control is executed. Usually, upon escapement from a corner, there is no necessity to carry out shift down, and therefore, the process described above prevents shift down from being carried out by a wrong speed change operation. It is to be noted that, if a negative decision is made at step S16, then it is determined that the cornering state cannot be decided, thereby directly ending the series of controls.

It is to be noted that the configuration of the twin clutch type speed change gear, the setting of the corresponding roll angles in the normal speed change, soft speed change and direct speed change, the setting of the clutch switching speed and so forth are not limited to those in the embodiment described above but can be altered in various manners. The speed change controlling apparatus according to the present invention can be applied to various vehicles such as saddle type three/four-wheeled vehicles.

What is claimed is:

1. A speed change controlling apparatus for a motorcycle that includes an engine adapted to generate driving force, the speed change controlling apparatus being disposed between said engine and a driving wheel and being adapted to carry out speed change for the generated driving force so as to transmit the resulting driving force to the driving wheel, said speed change controlling apparatus including a roll angle detection device and a control section, said roll angle detection device being configured to detect a roll angle of the motorcycle and to communicate said detected roll angle to said control section, said control section being adapted to control said speed change controlling apparatus in response to a predetermined speed changing request, wherein:
said speed control section controls said speed change controlling apparatus to carry out normal speed change control when the detected roll angle is less than or equal to a first predetermined roll angle;
said speed control section controls said speed change controlling apparatus to carry out a soft speed change control when the detected roll angle is greater than said first predetermined roll angle and less than a second predetermined roll angle, wherein said normal speed change control provides a first rate of change of driving force and said soft speed change control provides a second rate of change of driving force, said first rate of change of driving force being greater than said second rate of change of driving force.

2. The speed change controlling apparatus for the motorcycle according to claim 1, wherein said control section carries out the speed change operation by direct speed change control when the detected roll angle is between zero and a third predetermined roll angle, said third predetermined roll angle being smaller than said first predetermined roll angle, wherein said direct speed change control provides a third rate of change of the driving force, said third rate of change of driving force being greater than said first rate of change of driving force and wherein the control section performs normal speed change control when the detected roll angle is between the third roll angle and the first roll angle.

3. The speed change controlling apparatus for the motorcycle according to claim 2, wherein said control section changes a switching speed of a clutch of a twin clutch type speed change gear, which includes a one-side clutch and the other side clutch, to make the rate of change of driving force in the soft speed change control, normal speed change control and direct speed change control different from one another.

4. The speed change controlling apparatus for the motorcycle according to claim 3, wherein, as the roll angle increases, a timing at which a clutch capacity is increased is delayed in order to change over the one side clutch or the other side clutch, which has been in a disconnection state, before the speed change, into a connection state.

5. The speed change controlling apparatus for the motorcycle according to claim 4, wherein the roll angle is decided with reference to a gravity direction using said roll angle detection device, which is configured from a gyro sensor.

6. The speed change controlling apparatus for the motorcycle according to claim 4, wherein, when the roll angle exceeds the second predetermined roll angle, the speed change operation is inhibited.

7. The speed change controlling apparatus for the motorcycle according to claim 3, wherein the roll angle is decided with reference to a gravity direction using said roll angle detection device, which is configured from a gyro sensor.

8. The speed change controlling apparatus for the motorcycle according to claim 3, wherein, when the roll angle exceeds the second roll angle, the speed change operation is inhibited.

9. The speed change controlling apparatus for the motorcycle according to claim 2, wherein the roll angle is decided with reference to a gravity direction using said roll angle detection device, which is configured from a gyro sensor.

10. The speed change controlling apparatus for the motorcycle according to claim 2, wherein, when the roll angle exceeds the second predetermined roll angle, the speed change operation is inhibited.

11. The speed change controlling apparatus for the motorcycle according to claim 1, wherein the roll angle is decided with reference to a gravity direction using said roll angle detection device, which is configured from a gyro sensor.

12. The speed change controlling apparatus for the motorcycle according to claim 11, wherein, when the roll angle exceeds the second predetermined roll angle, the speed change operation is inhibited.

13. The speed change controlling apparatus for the motorcycle according to claim 1, wherein, when the roll angle exceeds the second predetermined roll angle, the speed change operation is inhibited.

14. The speed change controlling apparatus for the motorcycle according to claim 1, wherein:
said roll angle detection device is configured from a gyro configured to detect the roll angle and a pitch angle of the motorcycle, wherein:
when the pitch angle of the motorcycle exceeds a second predetermined pitch angle, the control section inhibits the speed change operation; and,
when the pitch angle of the motorcycle is between a first predetermined pitch angle and the second predetermined pitch angle, said first predetermined pitch angle being less than said second predetermined pitch angle, said control second carries out the speed change operation by the soft speed change control.

15. The speed change controlling apparatus for the motorcycle according to claim 1, wherein:
said roll angle detection device is configured from a gyro sensor capable of detecting the roll angle and a yaw angle of the motorcycle, and
the control section detects the yaw angle when the soft speed change control is executed in response to the roll angle and decides whether the motorcycle is advancing into a corner or escaping from a corner based on a relationship between the yaw angle and the roll angle, and executes, when the motorcycle is advancing into a corner, the soft speed change control wherein shift up is inhibited but shift down is permitted, and executes, when the motorcycle is escaping from a corner, the soft speed change control wherein shift down is inhibited but shift up is permitted.

* * * * *